(12) United States Patent
Yu et al.

(10) Patent No.: US 11,355,604 B2
(45) Date of Patent: Jun. 7, 2022

(54) SEMICONDUCTOR DEVICE, LAYOUT DESIGN METHOD FOR THE SAME AND METHOD FOR FABRICATING THE SAME

(71) Applicant: Samsung Electronics Co., Ltd., Suwon-si (KR)

(72) Inventors: Ji Su Yu, Seoul (KR); Hyeon Gyu You, Wanju-Gun (KR); Seung Man Lim, Siheung-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 82 days.

(21) Appl. No.: 16/857,288

(22) Filed: Apr. 24, 2020

(65) Prior Publication Data

US 2021/0104611 A1    Apr. 8, 2021

(30) Foreign Application Priority Data

Oct. 8, 2019    (KR) ........................ 10-2019-0124324

(51) Int. Cl.
| | | |
|---|---|---|
| *H01L 29/417* | (2006.01) | |
| *H01L 27/088* | (2006.01) | |
| *H01L 29/40* | (2006.01) | |
| *H01L 29/78* | (2006.01) | |
| *H01L 23/522* | (2006.01) | |

(Continued)

(52) U.S. Cl.
CPC ...... *H01L 29/41791* (2013.01); *G06F 30/392* (2020.01); *G06F 30/3953* (2020.01); *H01L 23/528* (2013.01); *H01L 23/5226* (2013.01); *H01L 27/0886* (2013.01); *H01L 29/401* (2013.01); *H01L 29/42372* (2013.01);
(Continued)

(58) Field of Classification Search
CPC .................. H01L 23/528; H01L 29/42372
See application file for complete search history.

(56) References Cited

U.S. PATENT DOCUMENTS

| | | |
|---|---|---|
| 7,503,026 B2 | 3/2009 | Ichiryu et al. |
| 9,483,600 B2 | 11/2016 | Bansal et al. |

(Continued)

FOREIGN PATENT DOCUMENTS

| | | |
|---|---|---|
| CN | 110518009 A | 11/2019 |
| JP | 2009272340 A | 11/2009 |

(Continued)

*Primary Examiner* — Farun Lu
(74) *Attorney, Agent, or Firm* — Harness, Dickey & Pierce, P.L.C.

(57) ABSTRACT

A semiconductor device includes a first and second active pattern extending in a first direction on a substrate, a first and second gate electrode extending in a second direction to intersect the first and second active pattern, a first source/drain contact extending in the second direction and connected to a first and source/drain region of the first and second active patterns, respectively, a first source/drain via connected to the first source/drain contact, a first cell separation film extending in the second direction and crosses the first active pattern and the second active pattern, between the first source/drain contact and the second gate electrode, a first gate via connected to the second gate electrode and arranged with the first source/drain via along the first direction, and a first connection wiring which extending in the first direction and connects the first source/drain via and the first gate via.

20 Claims, 23 Drawing Sheets

(51) Int. Cl.
*G06F 30/392* (2020.01)
*G06F 30/3953* (2020.01)
*H01L 29/423* (2006.01)
*H01L 29/66* (2006.01)
*H01L 23/528* (2006.01)
*G06F 119/06* (2020.01)

(52) U.S. Cl.
CPC ...... *H01L 29/66795* (2013.01); *H01L 29/785* (2013.01); *G06F 2119/06* (2020.01)

(56) References Cited

U.S. PATENT DOCUMENTS

2017/0200727 A1* 7/2017 Yoon .................. H01L 23/5252
2019/0065650 A1  2/2019 Pelloie

FOREIGN PATENT DOCUMENTS

JP  2010141047 A  6/2010
JP  2010287768 A  12/2010

* cited by examiner

SEMICONDUCTOR DEVICE, LAYOUT DESIGN METHOD FOR THE SAME AND METHOD FOR FABRICATING THE SAME

This application claims priority to Korean Patent Application No. 10-2019-0124324, filed on Oct. 8, 2019, and all the benefits accruing therefrom under 35 U.S.C. § 119, the disclosure of which is incorporated herein by reference in its entirety.

BACKGROUND

1. Technical Field

Inventive concepts relate to a semiconductor device, a layout design method for the semiconductor device, and a method for fabricating the semiconductor device.

2. Description of Related Art

Due to characteristics such as miniaturization, multi-functionality and/or low fabricating cost, semiconductor devices are in the limelight as important elements in the electronics industry. Semiconductor devices may be classified into a semiconductor memory device that stores logic data, a semiconductor logic device that performs arithmetic processing on the logic data, and a hybrid semiconductor device including a memory element and a logic element and the like.

As the electronics industry is highly developed, there are increasing demands for the characteristics of semiconductor devices. For example, there are increasing demands for high reliability, high speed, and/or multi-functionality of the semiconductor devices. In order to satisfy these desired characteristics, the structure in the semiconductor device becomes increasingly complicated and highly integrated.

SUMMARY

Aspects of inventive concepts provide a semiconductor device in which the use of top wirings is reduced and power loss and PnR (Placement and Routing) resource loss is reduced.

Aspects of inventive concepts also provide a layout design method for a semiconductor device in which the use of top wirings is reduced and power loss and PnR resource loss are reduced.

Aspects of inventive concepts also provide a method for fabricating a semiconductor device in which the use of top wirings is reduced and the power loss and the PnR resource loss are reduced.

However, aspects of inventive concepts are not restricted to the one set forth herein. The above and other aspects of inventive concepts will become more apparent to one of ordinary skill in the art to which inventive concepts pertains by referencing the detailed description of inventive concepts given below.

According to an aspect of inventive concepts, a semiconductor device includes a substrate; a first active pattern extending in a first direction on the substrate; a second active pattern extending in the first direction on the substrate; a first gate electrode extending in a second direction, the second direction intersecting the first direction, the first gate electrode intersecting the first active pattern and the second active pattern; a first source/drain contact extending in the second direction on one side of the first gate electrode, the first source/drain contact connecting to a first source/drain region of the first active pattern and a second source/drain region of the second active pattern; a first source/drain via connected to the first source/drain contact; a second gate electrode extending in the second direction, the second gate electrode intersecting the first active pattern and the second active pattern; a first cell separation film extending in the second direction between the first source/drain contact and the second gate electrode, the first cell separation film crossing the first active pattern and the second active pattern; a first gate via connected to the second gate electrode and arranged together with the first source/drain via along the first direction; and a first connection wiring extending in the first direction and connecting the first source/drain via and the first gate via.

According to an aspect of inventive concepts, a semiconductor device includes a first cell region, and a second cell region and a third cell region each placed on both sides of the first cell region in a first direction. The semiconductor device further includes a first active region and a second active region extending in the first direction on the first cell region, the second cell region, and the third cell region, the second active region spaced apart from the first active region in a second direction intersecting the first direction; a first gate electrode extending in the second direction in the first cell region; a first source/drain contact extending in the second direction in the first cell region on one side of the first gate electrode, the first source/drain contact connected to the first active region and the second active region, a second gate electrode extending in the second direction in the second cell region; a second source/drain contact in the second cell region on one side of the second gate electrode; a first connection wiring extending in the first direction and connected to the second source/drain contact and the first gate electrode; a third gate electrode extending in the second direction in the third cell region; and a second connection wiring extending in the first direction and connected to the first source/drain contact and the third gate electrode, the second connection wiring and the first connection wiring being spaced apart from each other in the second direction in the first cell region.

According to an aspect of inventive concepts, a semiconductor device includes a first active pattern and a second active pattern each extending in a first direction on a substrate, each of the first active pattern and the second active pattern including a plurality of wire patterns sequentially stacked on the substrate and spaced apart from each other; a first gate electrode extending in a second direction, the second direction intersecting the first direction, the first gate electrode intersecting the first active pattern and the second active pattern; an input wiring connected to the first gate electrode and extending in the first direction; a source/drain contact extending in the second direction and connected to a first source/drain region of the first active pattern and a second source/drain region of the second active pattern, on one side of the first gate electrode; a second gate electrode extending in the second direction and intersecting the first active pattern and the second active pattern; a cell separation film extending in the second direction between the first gate electrode and the second gate electrode, the cell separation film crossing the first active pattern and the second active pattern; and a connection wiring extending in a straight line in the first direction and connected to the source/drain contact and the first gate electrode. The connection wiring and the input wiring may be spaced apart from each other in the second direction.

BRIEF DESCRIPTION OF THE DRAWINGS

The above and other aspects and features of inventive concepts will become more apparent by describing in detail example embodiments thereof with reference to the attached drawings, in which.

DETAILED DESCRIPTION

Figure 1:
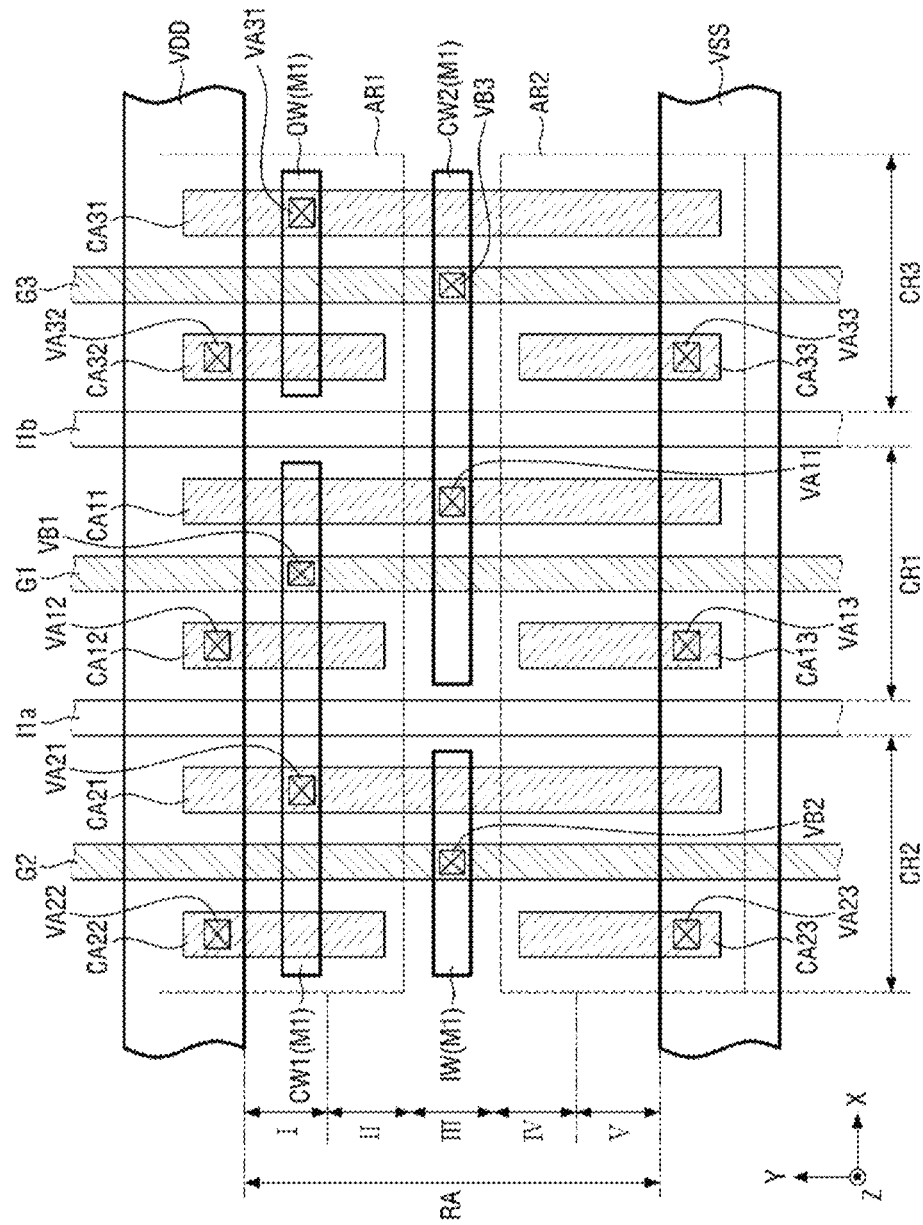
FIG. 1 is a layout diagram for explaining a semiconductor device according to some embodiments.

Hereinafter, a semiconductor device according to some embodiments will be described with reference to FIGS. 1 through 18.

In the drawings of the semiconductor device according to some embodiments, although a fin-type transistor (FinFET) including a channel area having a fin-type pattern shape is shown as examples, the present disclosure is not limited thereto. The semiconductor device according to some embodiments may, of course, include a tunneling transistor (FET), a transistor including a nanowire, a transistor including a nanosheet or a three-dimensional (3D) transistor. Also, the semiconductor device according to some embodiments of inventive concepts may include a bipolar junction transistor, a lateral double diffusion transistor (LDMOS), and the like.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present inventive concept.

FIG. 1 is a layout diagram for explaining a semiconductor device according to some embodiments. For reference, FIG. 1 may be a layout of a standard cell according to some embodiments provided in a cell library.

Referring to FIG. 1, the semiconductor device according to some embodiments includes a plurality of cell regions CR1 to CR3.

For example, the semiconductor device according to some embodiments may include a first cell region CR1, and a second cell region CR2 and a third cell region CR3 each placed on both sides of the first cell region CR1 in a first direction X.

In some embodiments, the first to third cell regions CR1 to CR3 may be separated by a first cell separation film I1*a* and a second cell separation film I1*b*. The first cell separation film I1*a* and the second cell separation film I1*b* may extend in a second direction Y intersecting the first direction X to separate the first to third cell regions CR1 to CR3.

For example, the first cell separation film I1*a* may extend in the second direction Y between the first cell region CR1 and the second cell region CR2. Therefore, the first cell region CR1 and the second cell region CR2 may be separated by the first cell separation film I1*a*. For example, the second cell separation film I1*b* may extend in the second direction Y between the first cell region CR1 and the third cell region CR3. Therefore, the first cell region CR1 and the third cell region CR3 may be separated by the second cell separation film I1*b*.

Also, the semiconductor device according to some embodiments includes a first active region AR1, a second active region AR2, a plurality of gate electrodes G1 to G3, a plurality of source/drain contacts CA11 to CA33, a plurality of source/drain vias VA11 to VA33, a plurality of gate vias VB1 to VB3, a first power supply wiring VDD, a second power supply wiring VSS and a plurality of wiring patterns M1.

The first active region AR1 and the second active region AR2 may extend side by side to be spaced apart from each other. For example, the first active region AR1 and the second active region AR2 may extend in the first direction X, respectively. The second active region AR2 may be spaced apart from the first active region AR1 in the second direction Y. In some embodiments, the first active region AR1 and the second active region AR2 may be formed throughout the first to third cell regions CR1 to CR3, respectively.

In some embodiments, semiconductor elements (e.g., transistors) of different conductivity types may be formed on the first active region AR1 and the second active region AR2. Hereinafter, the explanation will be made assuming that the first active region AR1 is a PFET region and the second active region AR2 is an NFET region. However, this is merely an example, and it is a matter of course that the first active region AR1 may be an NFET region and the second active region AR2 may be a PFET region.

The plurality of gate electrodes G1 to G3 may intersect the first active region AR1 and the second active region AR2, respectively. In addition, the plurality of gate electrodes G1 to G3 may extend side by side to be spaced apart from each other. For example, first to third gate electrodes G1 to G3 each extending in the second direction Y may be formed. The first to third gate electrodes G1 to G3 may be spaced apart from each other in the first direction X.

In some embodiments, the first gate electrode G1 may be formed in the first cell region CR1, the second gate electrode G2 may be formed in the second cell region CR2, and the third gate electrode G3 may be formed in the third cell region CR3.

A plurality of source/drain contacts CA11 to CA33 may be placed on both sides of the gate electrodes G1 to G3. For example, first to third source/drain contacts CA11 to CA13 placed on both sides of the first gate electrode G1, fourth to sixth source/drain contacts CA21 to CA23 placed on both sides of the second gate electrode G2, and seventh to ninth source/drain contacts CA31 to CA33 placed on both sides of the third gate electrode G3 may be formed.

The first source/drain contact CA11 may be placed on one side of the first gate electrode G1 in the first cell region CR1. In some embodiments, the first source/drain contact CA11 may connect the first active region AR1 and the second active region AR2. For example, the first source/drain contact CA11 may extend in the second direction Y and may be formed throughout the first active region AR1 and the second active region AR2.

The second source/drain contact CA12 and the third source/drain contact CA13 may be placed on the other side of the first gate electrode G1 in the first cell region CR1. In some embodiments, the second source/drain contact CA12 and the third source/drain contact CA13 may be spaced apart from each other. For example, the second source/drain contact CA12 may be formed in the first active region AR1, and the third source/drain contact CA13 may be formed in the second active region AR2.

A fourth source/drain contact CA21 may be placed on one side of the second gate electrode G2 in the second cell region CR2. In some embodiments, the fourth source/drain contact CA21 may connect the first active region AR1 and the second active region AR2.

A fifth source/drain contact CA22 and a sixth source/drain contact CA23 may be placed on the other side of the second gate electrode G2 in the second cell region CR2. In some embodiments, the fifth source/drain contact CA22 and the sixth source/drain contact CA23 may be spaced apart from each other.

A seventh source/drain contact CA31 may be placed on one side of the third gate electrode G3 in the third cell region CR3. In some embodiments, the seventh source/drain contact CA31 may connect the first active region AR1 and the second active region AR2.

An eighth source/drain contact CA32 and a ninth source/drain contact CA33 may be placed on the other side of the third gate electrode G3 in the third cell region CR3. In some embodiments, the eighth source/drain contact CA32 and the ninth source/drain contact CA33 may be spaced apart from each other. For example, the eighth source/drain contact CA32 may be formed in the first active region AR1, and the ninth source/drain contact CA33 may be formed in the second active region AR2.

The plurality of source/drain vias VA11 to VA33 may be placed to overlap the source/drain contacts CA11 to CA33 and may be connected to the source/drain contacts CA11 to CA33. Here, the term 'overlap' means an overlap in a third direction Z intersecting the first direction X and the second direction Y.

For example, first to third source/drain vias VA11 to VA13 connected to each of the first to third source/drain contacts CA11 to CA13 may be formed. Further, for example, fourth to sixth source/drain vias VA21 to VA23 connected to each of the fourth to sixth source/drain contacts CA21 to CA23 may be formed. Also, for example, seventh to ninth source/drain vias VA31 to VA33 connected to each of the seventh to ninth source/drain contacts CA31 to CA33 may be formed.

The plurality of gate vias VB1 to VB3 may be placed to overlap the gate electrodes G1 to G3 in the third direction Z, and may be connected to the gate electrodes G1 to G3.

For example, a first gate via VB1 connected to the first gate electrode G1, a second gate via VB2 connected to the second gate electrode G2, and a third gate via VB3 connected to the third gate electrode G3 may be formed.

The first power supply wiring VDD and the second power supply wiring VSS may extend side by side to be spaced apart from each other. For example, each of the first power supply wiring VDD and the second power supply wiring VSS may extend in the first direction X. The second power supply wiring VSS may be spaced apart from the first power supply wiring VDD in the second direction Y. In some embodiments, the first power supply wiring VDD and the second power supply wiring VSS may be formed throughout the first to third cell regions CR1 to CR3, respectively.

In some embodiments, the first power supply wiring VDD may be connected to some parts of the plurality of source/drain contacts CA11 to CA33. For example, the first power supply wiring VDD may be placed to overlap the second, fifth, and eighth source/drain vias VA12, VA22 and VA32 in the third direction Z. The first power supply wiring VDD may be connected to the second, fifth, and eighth source/drain contacts CA12, CA22 and CA32 by the second, fifth, and eighth source/drain vias VA12, VA22 and VA32.

In some embodiments, the second power supply wiring VSS may be connected to some other parts of the plurality of source/drain contacts CA11 to CA33. For example, the second power supply wiring VSS may be placed to overlap the third, sixth, and ninth source/drain vias VA13, VA23 and VA33 in the third direction Z. The second power supply wiring VSS may be connected to the third, sixth and ninth source/drain contacts CA13, CA23 and CA33 by the third, sixth and ninth source/drain vias VA13, VA23 and VA33.

The first power supply wiring VDD and the second power supply wiring VSS may provide a power supply voltage. In some embodiments, a drain voltage may be applied to the first power supply wiring VDD, and a source voltage may be applied to the second power supply wiring VSS. For example, although a positive voltage (+) may be applied to the first power supply wiring VDD, and a ground voltage GND or a negative voltage (−) may be applied to the second power supply wiring VSS, the present disclosure is not limited thereto.

The plurality of wiring patterns M1 may be formed between the first power supply wiring VDD and the second power supply wiring VSS. The plurality of wiring patterns M1 may be connected to still other parts of the plurality of source/drains contacts CA11 to CA33 or the gate electrodes G1 to G3. For example, the plurality of wiring patterns M1 may include a first wiring IW, a first connection wiring CW1, a second connection wiring CW2, and a second wiring OW.

The first wiring IW may be connected to the second gate electrode G2. For example, the first wiring IW may be placed to overlap the second gate via VB2 in the third direction Z. The first wiring IW may be connected to the second gate electrode G2 by the second gate via VB2. In some embodiments, the first wiring IW may extend in a straight line in the first direction X and overlap the second gate via VB2 in the third direction Z.

In some embodiments, the first wiring IW may function as an input wiring that provides an input signal to the second cell region CR2.

The first connection wiring CW1 may connect the fourth source/drain contact CA21 and the first gate electrode G1. For example, the first connection wiring CW1 may be placed to overlap the fourth source/drain via VA21 and the first gate via VB1 in the third direction Z. The first connection wiring CW1 may be connected to the fourth source/drain contact CA21 and the first gate electrode G1 by the fourth source/drain via VA21 and the first gate via VB1.

The first connection wiring CW1 extends in the first direction X and may be formed throughout the second cell region CR2 and the first cell region CR1. In some embodiments, the first connection wiring CW1 may extend in a straight line in the first direction X. For example, the fourth source/drain via VA21 and the first gate via VB1 may be arranged along the first direction X. Therefore, the first connection wiring CW1 extends in a straight line in the first direction X and may overlap the fourth source/drain via VA21 and the first gate via VB1 in the third direction Z.

In some embodiments, the first connection wiring CW1 receives an output signal from the second cell region CR2 and may provide it as an input signal to the first cell region CR1. That is, the first connection wiring CW1 may function as the output wiring of the second cell region CR2, and may function as the input wiring of the first cell region CR1.

The second connection wiring CW2 may connect the first source/drain contact CA11 and the third gate electrode G3. For example, the second connection wiring CW2 may be placed to overlap the first source/drain via VA11 and the third gate via VB3 in the third direction Z. The second connection wiring CW2 may be connected to the first source/drain contact CA11 and the third gate electrode G3 by the first source/drain via VA11 and the third gate via VB3.

The second connection wiring CW2 extends in the first direction X and may be formed throughout the first cell region CR1 and the third cell region CR3. In some embodiments, the second connection wiring CW2 may extend in a straight line in the first direction X. For example, the first source/drain via VA11 and the third gate via VB3 may be arranged along the first direction X. As a result, the second connection wiring CW2 extends in a straight line in the first direction X, and may overlap the first source/drain via VA11 and the third gate via VB3 in the third direction Z.

In some embodiments, the second connection wiring CW2 may receive an output signal from the first cell region CR1 and provide it as an input signal to the third cell region CR3. That is, the second connection wiring CW2 may function as the output wiring of the first cell region CR1, and may function as the input wiring of the third cell region CR3.

The second wiring OW may be connected to the seventh source/drain contact CA31. For example, the second wiring OW may be placed to overlap the seventh source/drain via VA31 in the third direction Z. The second wiring OW may be connected to the seventh source/drain contact CA31 by the seventh source/drain via VA31. In some embodiments, the second wiring OW may extend in a straight line in the first direction X and overlap the seventh source/drain via VA31 in the third direction Z.

In some embodiments, the second wiring OW may function as an output wiring that receives an output signal from the third cell region CR3.

In some embodiments, a plurality of routing regions RA for placing a plurality of wiring patterns M1 may be defined between the first power supply wiring VDD and the second power supply wiring VSS. At this time, the first connection wiring CW1 may be placed in one of the plurality of routing regions RA, and the second connection wiring CW2 may be placed in the other one of the plurality of routing regions RA.

For example, first to fifth routing regions I to V arranged in order along the second direction Y may be formed between the first power supply wiring VDD and the second power supply wiring VSS. At this time, as shown, the first connection wiring CW1 may be placed in the first routing region I, and the second connection wiring CW2 may be placed the third routing region III.

Thus, the first connection wiring CW1 and the second connection wiring CW2 may be spaced apart from each other in the second direction Y. In the first cell region CR1, the first connection wiring CW1 and the second connection wiring CW2 may overlap in the second direction Y. Since each of the first connection wiring CW1 and the second connection wiring CW2 may extend in the first direction X, the first connection wiring CW1 and the second connection wiring CW2 may not overlap each other in the first direction X.

Although a plurality of routing regions RA have been described as including only five routing regions, this is only an example, and the number of routing regions RA may, of course, be various.

In some embodiments, the first connection wiring CW1 and the first wiring IW may be spaced apart from each other in the second direction Y. For example, the first connection wiring CW1 may be placed in the first routing region I, and the first wiring IW may be placed in the third routing region III. In some embodiments, the first wiring IW and the second connection wiring CW2 may overlap each other in the first direction X.

In some embodiments, the second connection wiring CW2 and the second wiring OW may be spaced apart from each other in the second direction Y. For example, the second connection wiring CW2 may be placed in the third routing region III, and the second wiring OW may be placed in the first routing region I. In some embodiments, the second wiring OW and the first connection wiring CW1 may overlap each other in the first direction X.

As the structure in the semiconductor device becomes increasingly complicated and highly integrated, the use of a top wiring for routing of the semiconductor device increases. However, excessive use of the top wiring induces power loss and PnR resource loss, which causes degradation of the performance and productivity of the semiconductor device.

However, the semiconductor device according to some embodiments may reduce the use of the top wiring, using the first connection wiring CW1 and/or the second connection wiring CW2.

For example, as described above, the first gate via VB1 of the first cell region CR1 and the fourth source/drain via VA21 of the second cell region CR2 may be arranged along the first direction X. As a result, since the first connection wiring CW1 may extend in a straight line in the first direction X, the first connection wiring CW1 may connect the first gate electrode G1 of the first cell region CR1 and the fourth source/drain contact CA21 of the second cell region CR2 to each other without the use of the additional top wiring.

Further, as described above, the first source/drain via VA11 of the first cell region CR1 and the third gate via VB3 of the third cell region CR3 may be arranged along the first direction X. As a result, since the second connection wiring CW2 may extend in a straight line in the first direction X, the second connection wiring CW2 may connect the first source/drain contact CA11 of the first cell region CR1 and the third gate electrode G3 of the third cell region CR3 to each other without the use of additional top wiring.

Figure 2:
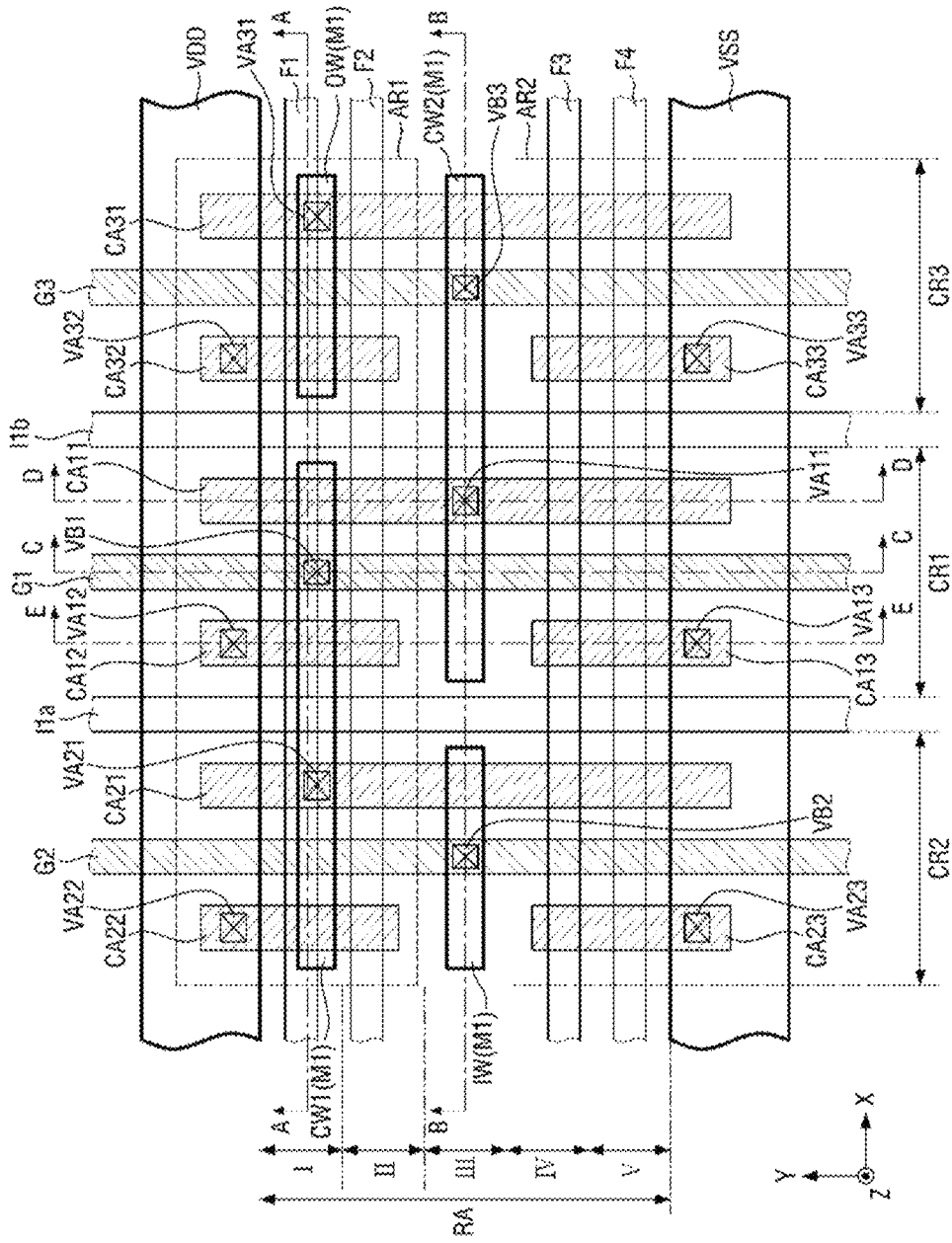
FIG. 2 is a plan view for explaining a semiconductor device according to some embodiments.
Figure 3:
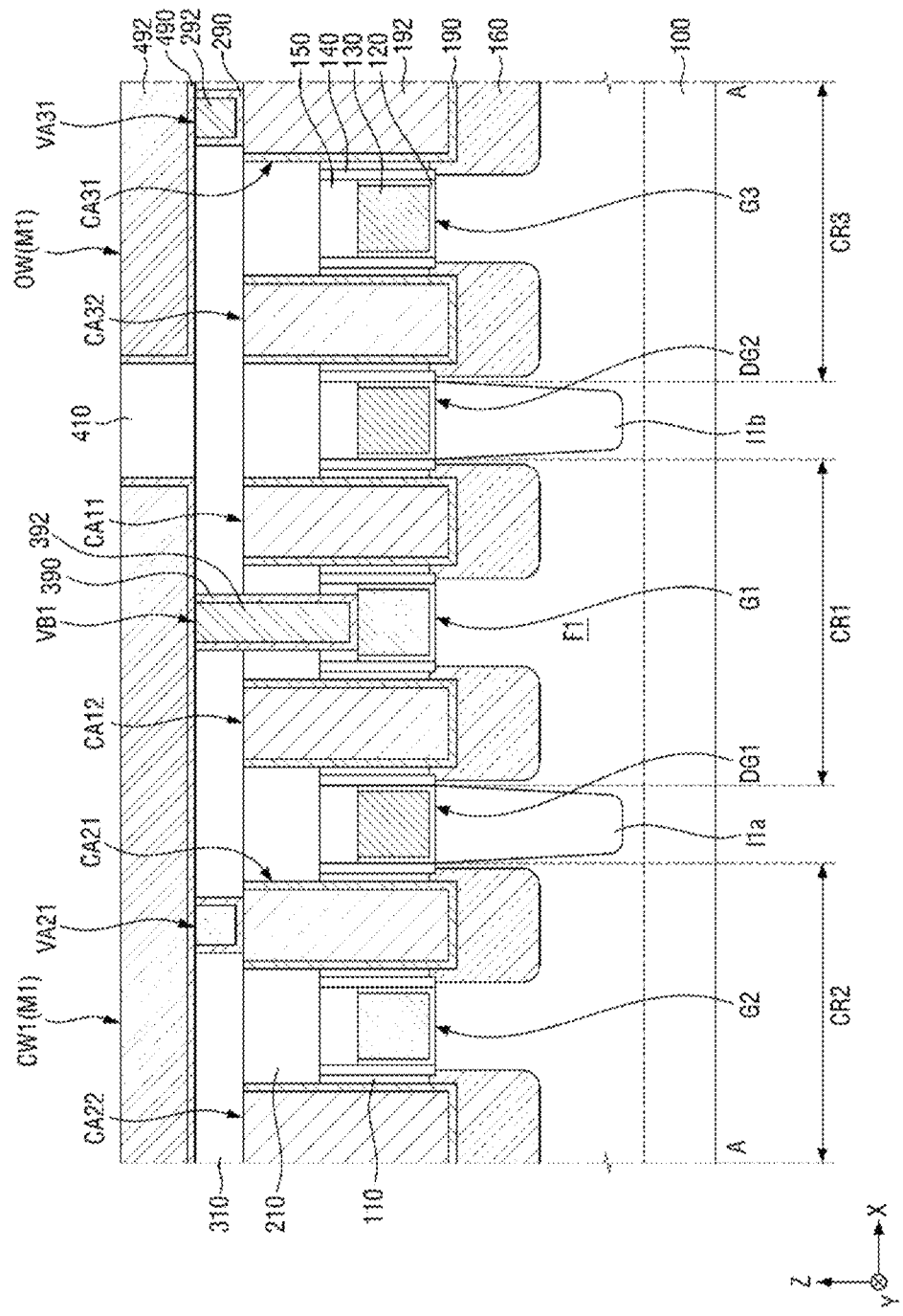
FIG. 3 is a cross-sectional view taken along a line A-A of FIG. 2.
Figure 4:
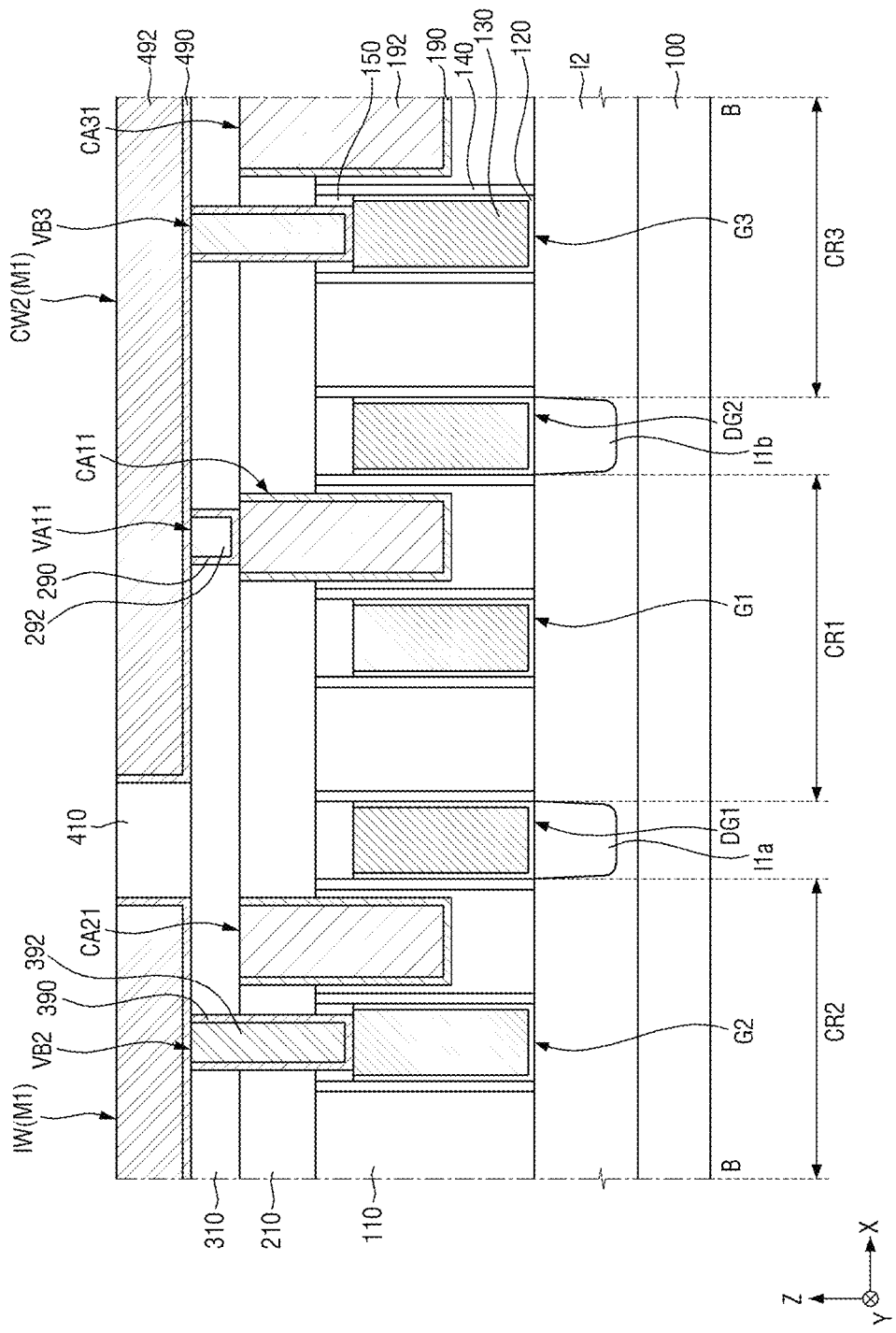
FIG. 4 is a cross-sectional view taken along a line B-B of FIG. 2.
Figure 5:
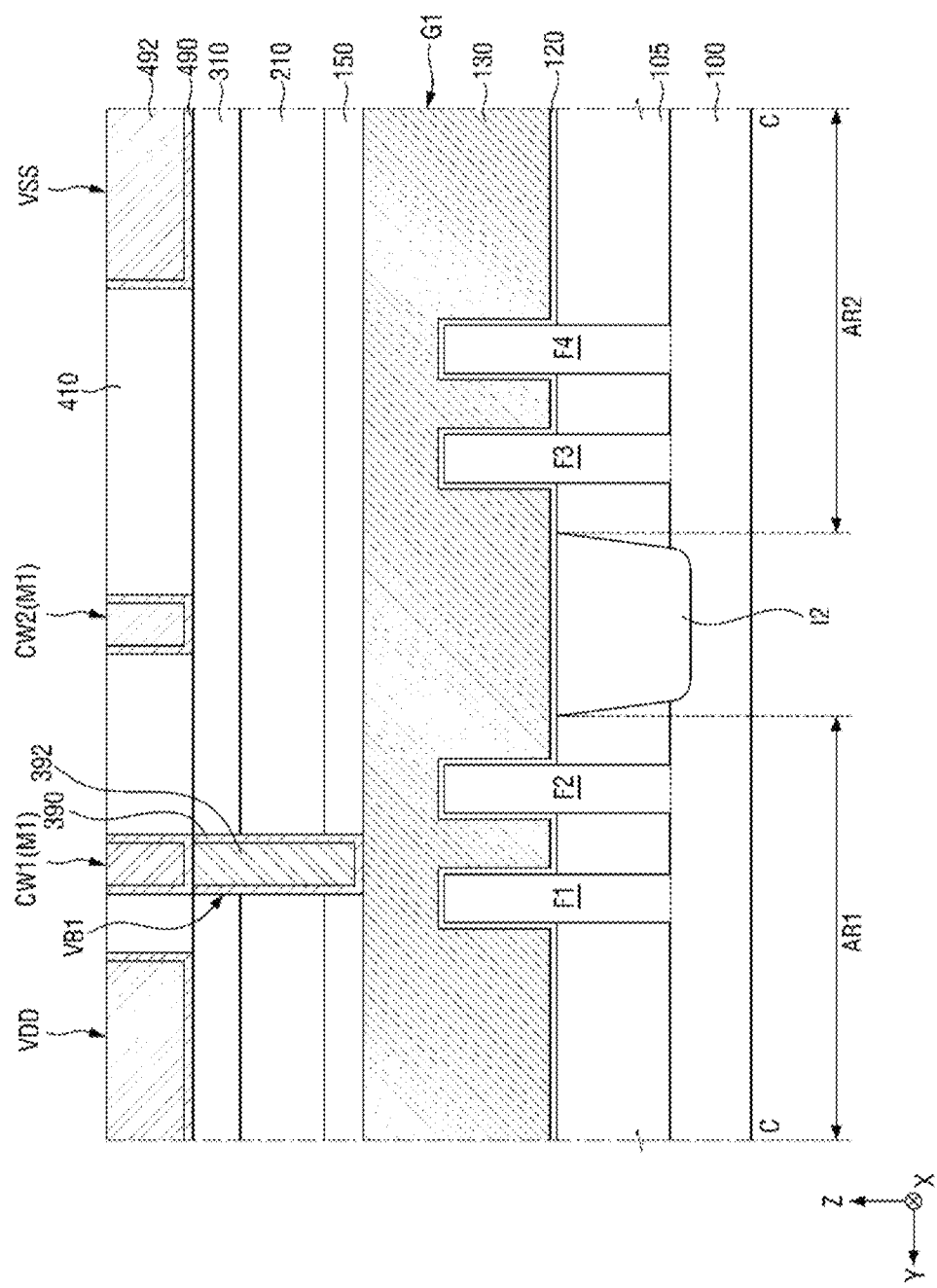
FIG. 5 is a cross-sectional view taken along a line C-C of FIG. 2.
Figure 6:
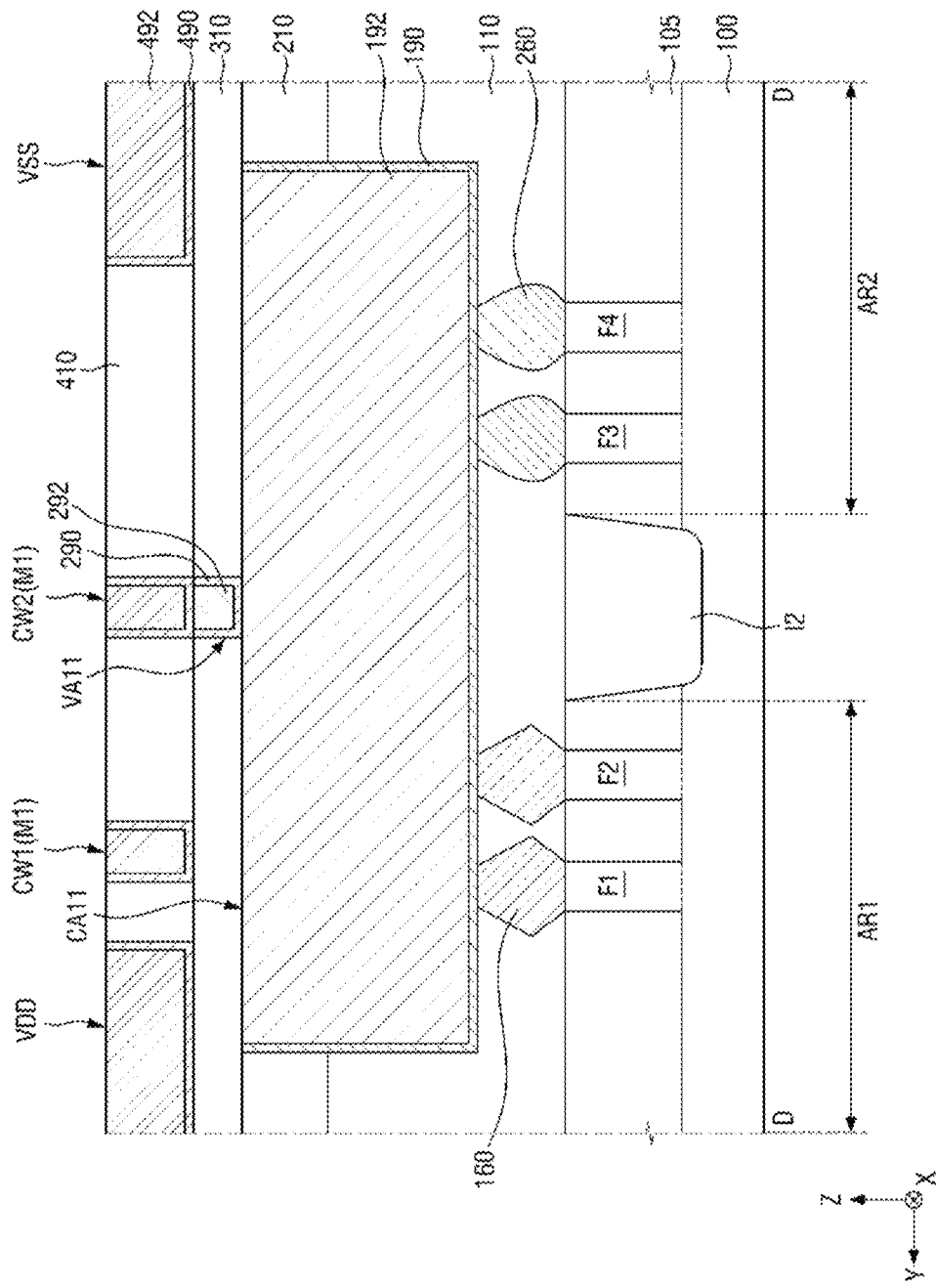
FIG. 6 is a cross-sectional view taken along a line D-D of FIG. 2.
Figure 7:
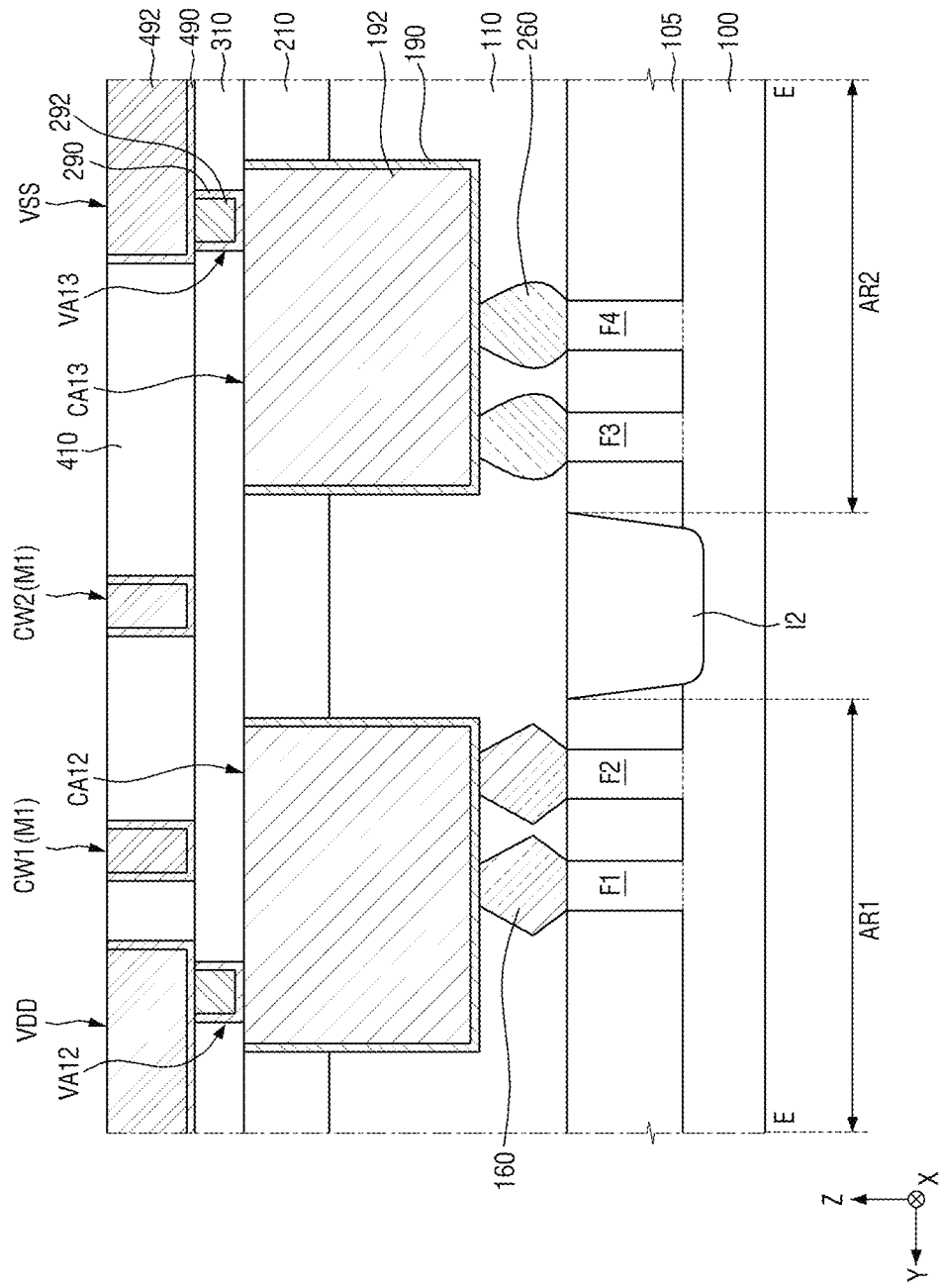
FIG. 7 is a cross-sectional view taken along a line E-E of FIG. 2.

FIG. 2 is a plan view for explaining a semiconductor device according to some embodiments. FIG. 3 is a cross-sectional view taken along a line A-A of FIG. 2. FIG. 4 is a cross-sectional view taken along a line B-B of FIG. 2. FIG. 5 is a cross-sectional view taken along a line C-C of FIG. 2. FIG. 6 is a cross-sectional view taken along a line D-D of FIG. 2. FIG. 7 is a cross-sectional view taken along a line E-E of FIG. 2.

The semiconductor device shown in FIGS. 2 to 7 may be an example of the semiconductor device implemented by the use of the layout diagram of FIG. 1. For convenience of explanation, repeated parts of contents described above using FIG. 1 will be briefly described or omitted.

Referring to FIGS. 2 to 7, the semiconductor device according to some embodiments may be formed on the substrate 100.

The substrate 100 may be bulk silicon or SOI (silicon-on-insulator). In contrast, the substrate 100 may be a silicon substrate, or may include, but is not limited to, other materials such as silicon germanium, SGOI (silicon germanium on insulator), indium antimonide, lead tellurium compound, indium arsenide, indium phosphide, gallium arsenide or gallium antimonide.

The substrate 100 may include a first active region AR1 and a second active region AR2. For convenience of explanation, hereinafter, explanation will be made assuming that the first active region AR1 is a PFET region and the second active region AR2 is an NFET region.

In some embodiments, the first active region AR1 and the second active region AR2 may be separated by an element separation film 12. For example, as shown in FIGS. 5 to 7, the element separation film 12 may extend in the first direction X and separate the first active region AR1 and the second active region AR2.

A plurality of active patterns F1 to F4 may be formed on the substrate 100. For example, first and second active patterns F1 and F2 may be formed on the first active region AR1, and third and fourth active patterns F3 and F4 may be formed on the second active region AR2. In some embodiments, each of the active patterns F1 to F4 may include a fin-type pattern protruding from the upper surface of the substrate 100.

The first to fourth active patterns F1 to F4 may extend side by side to be spaced apart from each other. For example, each of the first to fourth active patterns F1 to F4 may extend in the first direction X. Further, the first to fourth active patterns F1 to F4 may be arranged in order along the second direction Y. In some embodiments, each of the first to fourth active patterns F1 to F4 may be formed throughout the first to third cell regions CR1 to CR3.

In some embodiments, the first cell separation film I1a and the second cell separation film I1b may cross the first to fourth active patterns F1 to F4. The first cell separation film I1a and the second cell separation film I1b may define the first to third cell regions CR1 to CR3 across the first to fourth active patterns F1 to F4. For example, as shown in FIGS. 3 and 4, the first cell separation film I1a may define the first cell region CR1 and the second cell region CR2 across the first active pattern F1. In addition, the second cell separation film I1b may define the first cell region CR1 and the third cell region CR3 across the first active pattern F1.

The field insulating film 105 may be formed on the substrate 100. In some embodiments, the field insulating film 105 may surround some of the side surfaces of the first to fourth active patterns F1 to F4. For example, as shown in FIG. 5, some of the first to fourth active patterns F1 to F4 may protrude upward from the field insulating film 105.

The field insulating film 105 may include, but is not limited to, for example, at least one of silicon oxide ($SiO_2$), silicon nitride (SiN), silicon oxynitride (SiON), silicon oxycarbonitride (SiOCN) or a combination thereof.

The gate electrodes G1 to G3 may intersect the first to fourth active patterns F1 to F4, respectively. Each of the gate electrodes G1 to G3 may include a gate conductive film 130. For example, the gate conductive film 130 may include, but is not limited to, at least one of Ti, Ta, W, Al, Co, and combinations thereof. The gate conductive film 130 may include, for example, silicon, silicon germanium or the like rather than metal.

Although the gate conductive film 130 is shown as a single film, the present disclosure is not limited thereto. Unlike the shown example, the gate conductive film 130 may be formed by stacking a plurality of conductive materials. For example, the gate conductive film 130 may include a work function adjusting film that adjusts a work function, and a filling conductive film that fills a space formed by the work function adjusting film. The work function adjusting film may include at least one of TiN, TaN, TiC, TaC, TiAlC, and a combination thereof. The filling conductive film may contain, for example, W or Al.

The gate conductive film 130 may be formed through, but is not limited to, for example, a replacement process.

In some embodiments, a first dummy gate electrode DG1 and a second dummy gate electrode DG2 intersecting each of the first to fourth active patterns F1 to F4 may be formed. The first dummy gate electrode DG1 may extend in the second direction Y between the first cell region CR1 and the second cell region CR2, and the second dummy gate electrode DG2 may extend in the second direction Y between the first cell region CR1 and the third cell region CR3.

In some embodiments, the first dummy gate electrode DG1 may be formed on the first cell separation film I1a, and the second dummy gate electrode DG2 may be formed on the second cell separation film I1b. In some embodiments, the first dummy gate electrode DG1 and the second dummy gate electrode DG2 may be omitted. For example, the first cell separation film I1a and the second cell separation film I1b may be formed to fill a region occupied by the first dummy gate electrode DG1 and the second dummy gate electrode DG2.

A gate dielectric film 120 may be interposed between the first to fourth active patterns F1 to F4 and the gate conductive film 130. For example, the gate dielectric film 120 may extend along the side wall and the bottom surface of the gate conductive film 130. However, the present disclosure is not limited thereto, and the gate dielectric film 120 may extend only along the bottom surface of the gate conductive film 130.

In some embodiments, a part of the gate dielectric film 120 may be interposed between the field insulating film 105 and the gate conductive film 130. For example, as shown in FIG. 5, the gate dielectric film 120 may extend along the upper surface of the field insulating film 105.

The gate dielectric film 120 may include, for example, at least one of silicon oxide, silicon oxynitride, silicon nitride, and a high-k material having a higher dielectric constant than silicon oxide. The high-k material may include, but is not limited to, for example, hafnium oxide.

A gate spacer 140 may be formed on the substrate 100 and the field insulating film 105. In addition, the gate spacer 140 may extend along both sides of the gate conductive film 130. Accordingly, the gate spacer 140 may intersect the first to fourth active patterns F1 to F4. For example, the gate spacer 140 may extend in the second direction Y.

The gate spacer 140 may include, but is not limited to, for example, at least one of silicon oxide, silicon nitride, silicon oxynitride, and combinations thereof.

A gate capping pattern 150 may cover the upper surface of the gate conductive film 130. For example, the gate capping pattern 150 may extend along the upper surface of the gate conductive film 130. In addition, the gate capping pattern 150 may extend in the second direction Y.

A first source/drain region 160 may be formed on the first active region AR1. For example, the first source/drain region 160 may be formed in the first and second active patterns F1 and F2 on both sides of the gate conductive film 130. However, the first source/drain region 160 may be insulated from the gate conductive film 130. For example, the first source/drain region 160 may be spaced apart from the gate conductive film 130 by the gate spacer 140.

A second source/drain region 260 may be formed on the second active region AR2. For example, the second source/drain region 260 may be formed in the third and fourth active patterns F3 and F4 on both sides of the gate conductive film 130. However, the second source/drain region 260 may be insulated from the gate conductive film 130. For example, the second source/drain region 260 may be spaced apart from the gate conductive film 130 by the gate spacer 140.

Each of the first source/drain region 160 and the second source/drain region 260 may include an epitaxial layer formed in the first to fourth active patterns F1 to F4.

When the semiconductor device formed in the first active region AR1 is a PFET, the first source/drain region 160 may include a p-type impurity or an impurity for preventing diffusion of the p-type impurity. For example, the first source/drain region 160 may include at least one of B, C, In, Ga, and Al or a combination thereof.

When the semiconductor device formed in the second active region AR2 is an NFET, the second source/drain region 260 may include an n-type impurity or an impurity for preventing the diffusion of the n-type impurity. For example, the second source/drain region 260 may include at least one of P, Sb, As or a combination thereof.

Although each of the first source/drain region 160 and the second source/drain region 260 is shown as a single film, the present disclosure is not limited thereto. For example, the first source/drain region 160 and the second source/drain region 260 may be formed by multiple films including impurities of different concentrations.

A plurality of interlayer insulating films 110, 210, 310 and 410 may be formed on the substrate 100. For example, first to fourth interlayer insulating films 110, 210, 310 and 410 sequentially stacked on the substrate 100 may be formed.

In some embodiments, the first interlayer insulating film 110 and the second interlayer insulating film 210 may be formed to cover the field insulating film 105, the first source/drain region 160, the second source/drain region 260, the gate spacer 140 and the gate capping pattern 150. For example, the first interlayer insulating film 110 may cover the upper surface of the field insulating film 105, the upper surface of the first source/drain region 160, the upper surface of the second source/drain region 260, and the side surfaces of the gate spacer 140. For example, the second interlayer insulating film 210 may cover the upper surface of the gate capping pattern 150 and the upper surface of the first interlayer insulating film 110.

The first to fourth interlayer insulating films 110, 210, 310 and 410 may include, for example, at least one of silicon oxide, silicon nitride, silicon oxynitride, and low-k material having a lower dielectric constant than silicon oxide.

In some embodiments, the plurality of source/drain contacts CA11 to CA33 may penetrate the first interlayer insulating film 110 and the second interlayer insulating film 210 and may be connected to the first source/drain region 160 and/or the second source/drain region 260. For example, the second, fifth and eighth source/drain contacts CA12, CA22 and CA32 may be connected to the first source/drain region 160. Also, for example, the third, sixth and ninth source/drain contacts CA13, CA23 and CA33 may be connected to the second source/drain region 260. In some embodiments, the first, fourth and seventh source/drain contacts CA11, CA21 and CA31 may be connected to both the first source/drain region 160 and the second source/drain region 260.

In some embodiments, the plurality of source/drain vias VA11 to VA33 may penetrate the third interlayer insulating film 310 and may be connected to the source/drain contacts CA11 to CA33.

In some embodiments, the plurality of gate vias VB1 to VB3 may penetrate the gate capping pattern 150, the second interlayer insulating film 210, and the third interlayer insulating film 310, and may be connected to the gate electrodes G1 to G3.

In some embodiments, the plurality of wiring patterns M1 may be placed at the same level. In this specification, the expression "placed at the same level" means that the wiring patterns are formed at the same height on the basis of the upper surface of the substrate 100. Further, in this specification, the term "same" means not only completely the same thing but also a fine difference that may occur due to a process margin or the like.

For example, as shown in FIGS. 2 and 3, the first connection wiring CW1 is formed in the fourth interlayer insulating film 410, and may be connected to the fourth source/drain via VA21 and the first gate via VB1. Further, the second wiring OW is formed in the fourth interlayer insulating film 410 and may be connected to the seventh source/drain via VA31.

For example, as shown in FIGS. 2 and 4, the first wiring IW is formed in the fourth interlayer insulating film 410 and may be connected to the second gate via VB2. Also, the second connection wiring CW2 is formed in the fourth interlayer insulating film 410 and may be connected to the first source/drain via VA11 and the third gate via VB3.

Further, in some embodiments, the plurality of wiring patterns M1 may be formed at the same level. In this specification, the expression "formed at the same level" means that the wiring patterns are formed by the same fabricating process.

In some embodiments, the plurality of wiring patterns M1 may be placed at the same level as the first power supply wiring VDD and/or the second power supply wiring VSS.

For example, as shown in FIGS. 2 and 7, the first power supply wiring VDD is formed in the fourth interlayer insulating film 410, and may be connected to the second, fifth, and eighth source/drain vias VA12, VA22, and VA32. Also, the second power supply wiring VSS is formed in the fourth interlayer insulating film 410, and may be connected to the third, sixth, and ninth source/drain vias VA13, VA23 and VA33.

In some embodiments, the plurality of wiring patterns M1 may be formed at the same level as the first power supply wiring VDD and/or the second power supply wiring VSS.

Therefore, a semiconductor device in which the use of an additional top wiring is reduced and power loss and PnR resource loss are reduced may be provided.

In some embodiments, each of the source/drain contacts CA11 to CA33 may include a first barrier film 190 and a first filling film 192. The first barrier film 190 may extend along the upper surface of the first source/drain region 160, the upper surface of the second source/drain region 260, the side surface of the first interlayer insulating film 110, and the side surface of the second interlayer insulating film 210. The first filling film 192 may fill a space formed by the first barrier film 190.

In some embodiments, each of the source/drain vias VA11 to VA33 may include a second barrier film 290 and a second filling film 292. The second barrier film 290 may extend along the upper surfaces of the source/drain contacts CA11 to CA33 and the side surfaces of the third interlayer insulating film 310. The second filling film 292 may fill the space formed by the second barrier film 290.

In some embodiments, each of the gate vias VB1 to VB3 may include a third barrier film 390 and a third filling film 392. The third barrier film 390 may extend along the upper surfaces of the gate electrodes G1 to G3, the side surfaces of the gate capping pattern 150, the side surfaces of the second interlayer insulating film 210, and the side surfaces of the third interlayer insulating film 310. The third filling film 392 may fill the space formed by the third barrier film 390.

In some embodiments, the first power supply wiring VDD, the second power supply wiring VSS, and the plurality of wiring patterns M1 may include a fourth barrier film 490 and a fourth filling film 492, respectively. The fourth barrier film 490 may extend along the upper surfaces of the source/drain vias VA11 to VA33, the upper surfaces of the gate vias VB1 to VB3, the upper surface of the third interlayer insulating film 310, and the side surfaces of the fourth interlayer insulating film 410. The fourth filling film 492 may fill the space formed by the fourth barrier film 490.

The first to fourth barrier films 190 to 490 may include a metal or metal nitride for preventing diffusion of the first to fourth filling films 192 to 492. The first to fourth barrier films 190 to 490 may include, but is not limited to, for example, at least one of titanium (Ti), tantalum (Ta), tungsten (W), nickel (Ni), cobalt (Co), platinum (Pt), alloys thereof and nitrides thereof.

The first to fourth filling films 192 to 492 may include, but is not limited to, at least one of aluminum (Al), copper (Cu), tungsten (W), molybdenum (Mo), cobalt (Co), and alloys thereof.

The source/drain vias VA11 to VA33, the gate vias VB1 to VB3, the first power supply wiring VDD, the second power supply wiring VSS and the wiring patterns M1 may be formed by, but is not limited to, for example, a single damascene process. For example, the source/drain vias VA11 to VA33, the gate vias VB1 to VB3, the first power supply wiring VDD, the second power supply wiring VSS and the wiring patterns M1 may, of course, be formed, for example, by a dual damascene process or other wiring process.

Figure 8:
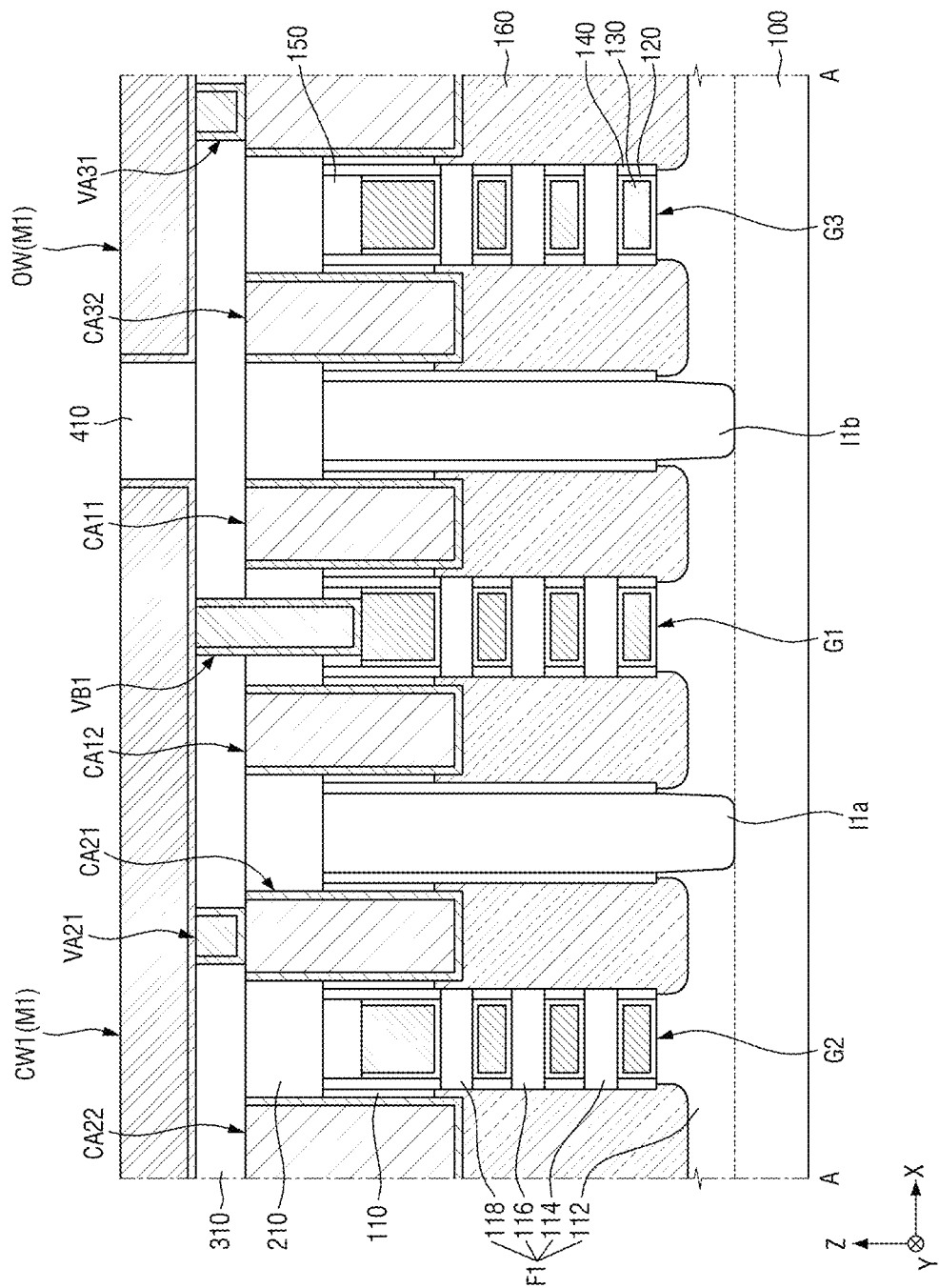
FIGS. 8 and 9 are cross-sectional views for explaining a semiconductor device according to some embodiments.
Figure 9:
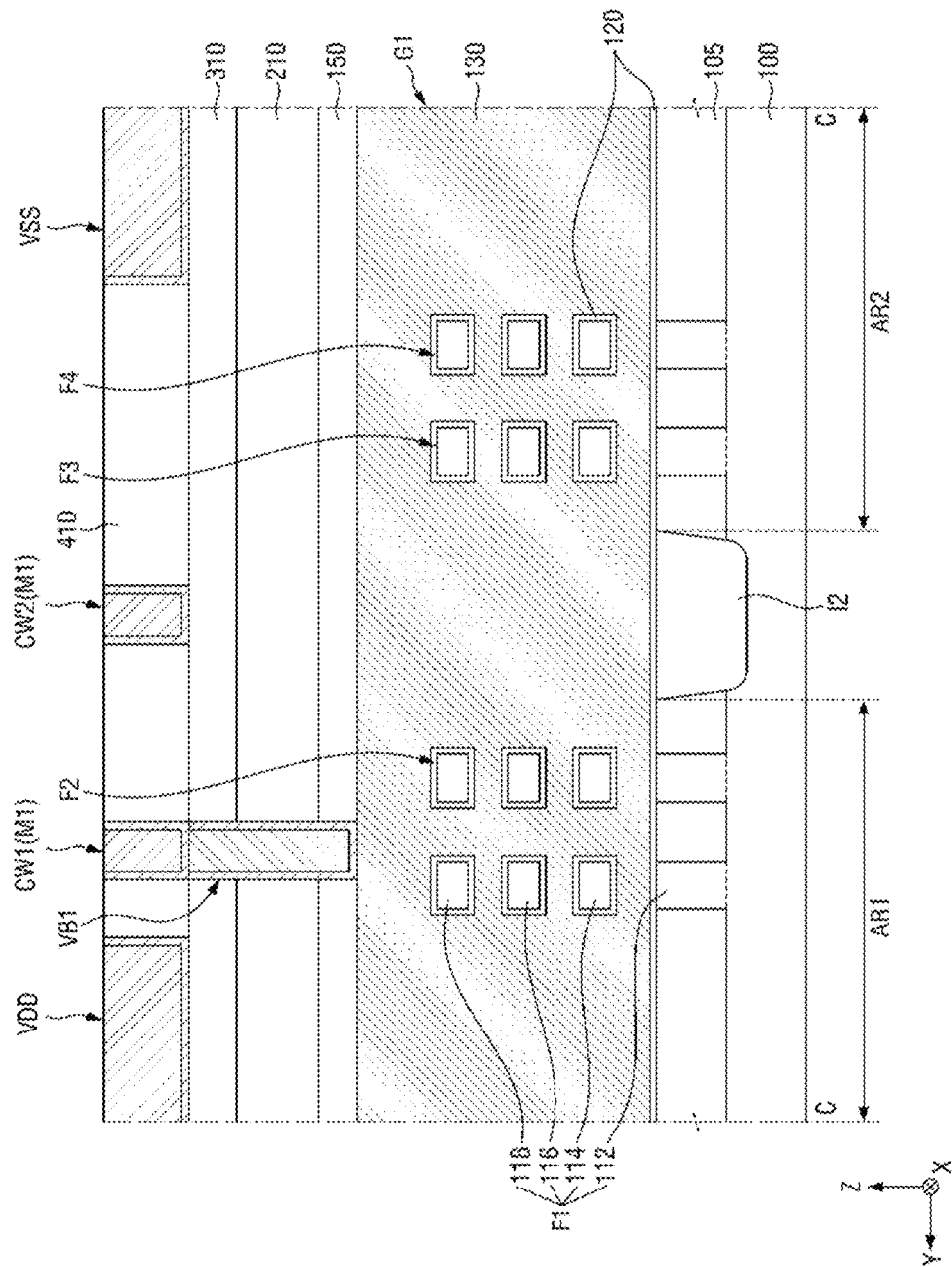

FIGS. 8 and 9 are cross-sectional views for explaining a semiconductor device according to some embodiments. For convenience of explanation, repeated parts of contents described above using FIGS. 1 to 7 will be briefly described or omitted.

For reference, FIG. 8 is a cross-sectional view taken along a line A-A of FIG. 2, and FIG. 9 is a cross-sectional view taken along a line C-C of FIG. 2.

Referring to FIGS. 8 and 9, in the semiconductor device according to some embodiments, each of the first to fourth active patterns F1 to F4 includes a plurality of wire patterns 114, 116 and 118.

For example, the first to fourth active patterns F1 to F4 may include first to third wire patterns 114, 116 and 118 that are sequentially stacked on the substrate 100 and spaced apart from each other. For example, the first wire pattern 114 may be spaced apart from the substrate 100 in the third direction Z, the second wire pattern 116 may be spaced apart from the first wire pattern 114 in the third direction Z, and the third wire pattern 118 may be spaced apart from the second wire pattern 116 in the third direction Z.

The first to third wire patterns 114, 116 and 118 may extend in the first direction X, respectively. Further, the first to third wire patterns 114, 116 and 118 may penetrate the first to third gate electrodes G1 to G3, respectively. Accordingly, as shown in FIG. 9, the first to third gate electrodes G1 to G3 may surround the outer surfaces of the first to third wire patterns 114, 116 and 118, respectively.

In FIG. 9, although the cross-sections of the first to third wire patterns 114, 116 and 118 are each shown as a rectangular shape, this is merely an example. For example, the cross-sections of the first to third wire patterns 114, 116 and 118 may be other polygonal shapes or circular shapes, respectively.

In some embodiments, each of the first to fourth active patterns F1 to F4 may further include a fin-type pattern 112 that protrudes from the upper surface of the substrate 100 and extends in the first direction X. The fin-type pattern 112 may be placed, for example, below the first wire pattern 114.

FIGS. 10 to 14 are layout diagrams for explaining the semiconductor device according to some embodiments. For convenience of explanation, repeated parts of contents described above using FIGS. 1 to 7 will be briefly described or omitted.

Figure 10:
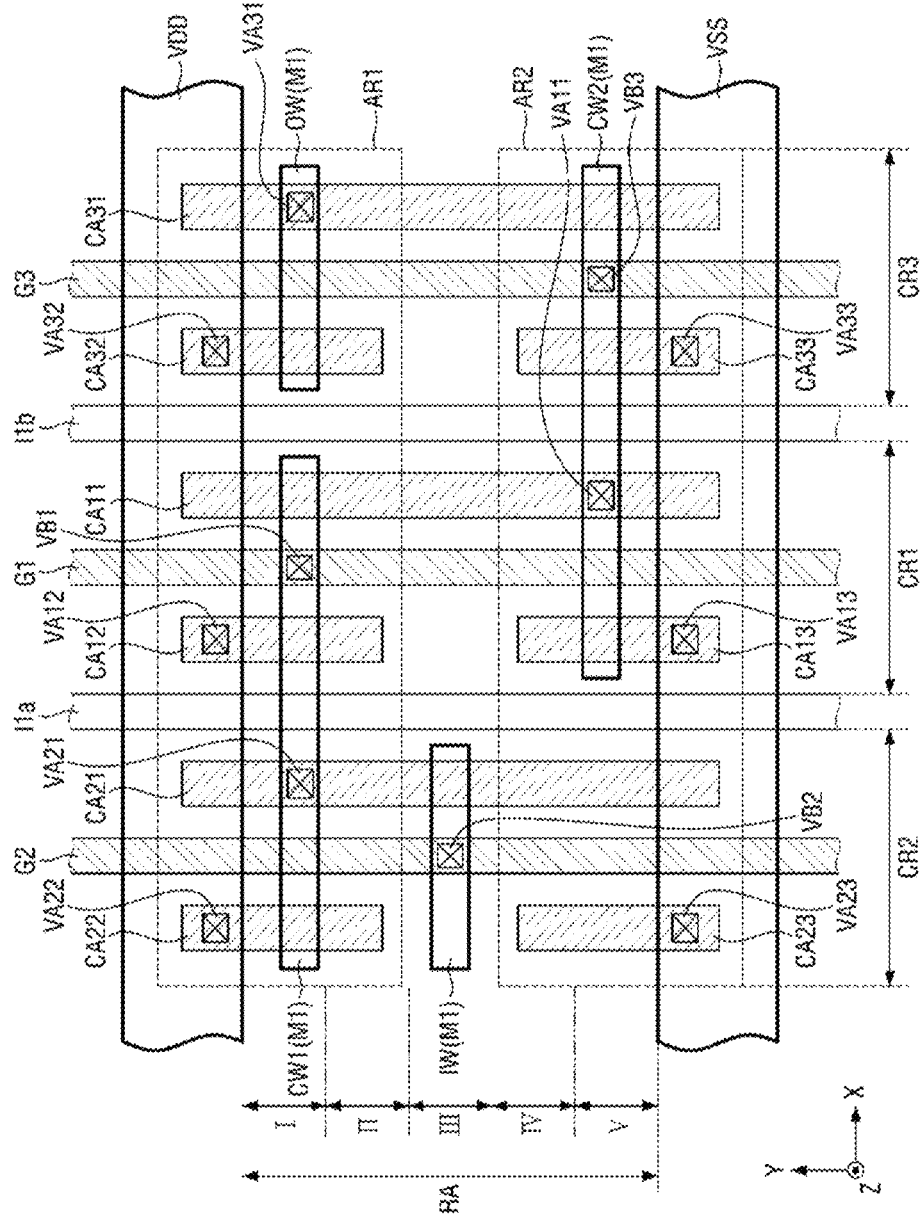
FIGS. 10 to 14 are layout diagrams for explaining the semiconductor device according to some embodiments.

Referring to FIG. 10, as compared with FIG. 1, the second connection wiring CW2 is placed in the fifth routing region V.

For example, the first source/drain via VA11 and the third gate via VB3 may all be placed in the fifth routing region V. In some embodiments, the second connection wiring CW2 extends in the first direction X within the fifth routing region V, and may connect the first source/drain via VA11 and the third gate via VB3.

Figure 11:
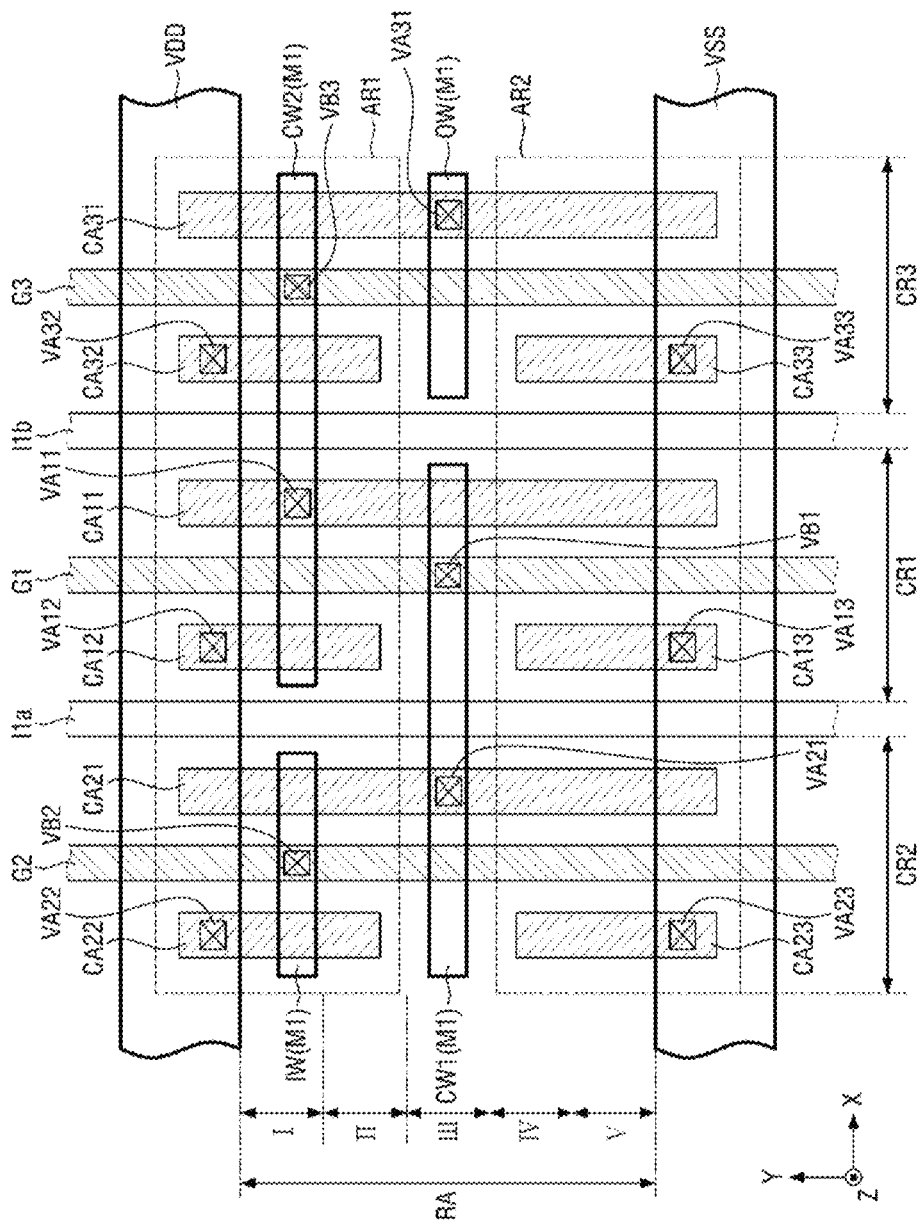

Referring to FIG. 11, compared with FIG. 1, the first connection wiring CW1 is placed in the third routing region III, and the second connection wiring CW2 is placed in the first routing region I.

For example, the fourth source/drain via VA21 and the first gate via VB1 may all be placed in the third routing region III. In some embodiments, the first connection wiring CW1 extends in the first direction X within the third routing region III, and may connect the fourth source/drain via VA21 and the first gate via VB1.

Further, for example, the first source/drain via VA11 and the third gate via VB3 may all be placed in the first routing region I. In some embodiments, the second connection wiring CW2 extends in the first direction X within the first routing region I, and may connect the first source/drain via VA11 and the third gate via VB3.

In some embodiments, the first wiring IW may be placed in the first routing region I, and the second wiring OW may be placed in the third routing region III.

Figure 12:
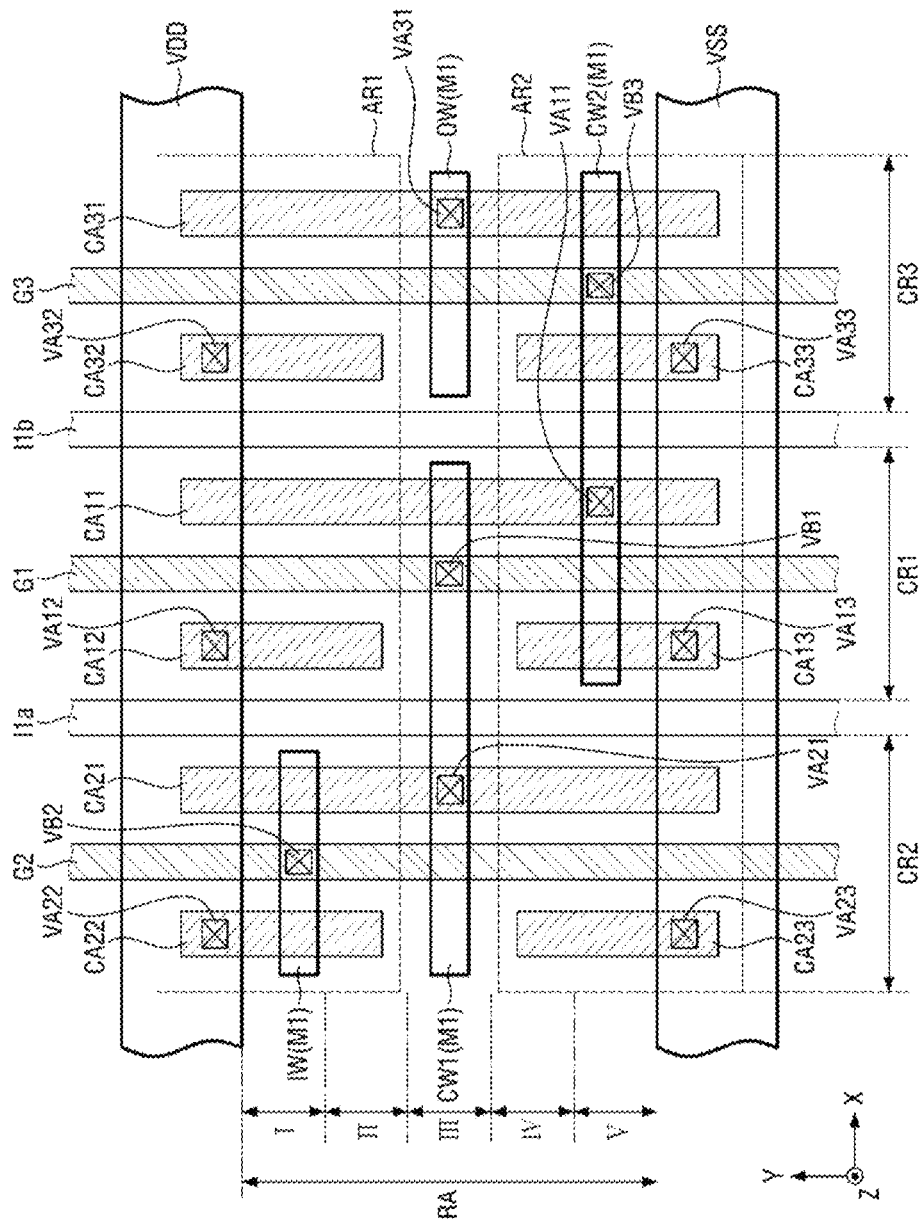

Referring to FIG. 12, compared with FIG. 11, the second connection wiring CW2 is placed in the fifth routing region V.

For example, the first source/drain via VA11 and the third gate via VB3 may all be placed in the fifth routing region V. In some embodiments, the second connection wiring CW2 extends in the first direction X within the fifth routing region V, and may connect the first source/drain via VA11 and the third gate via VB3.

Figure 13:
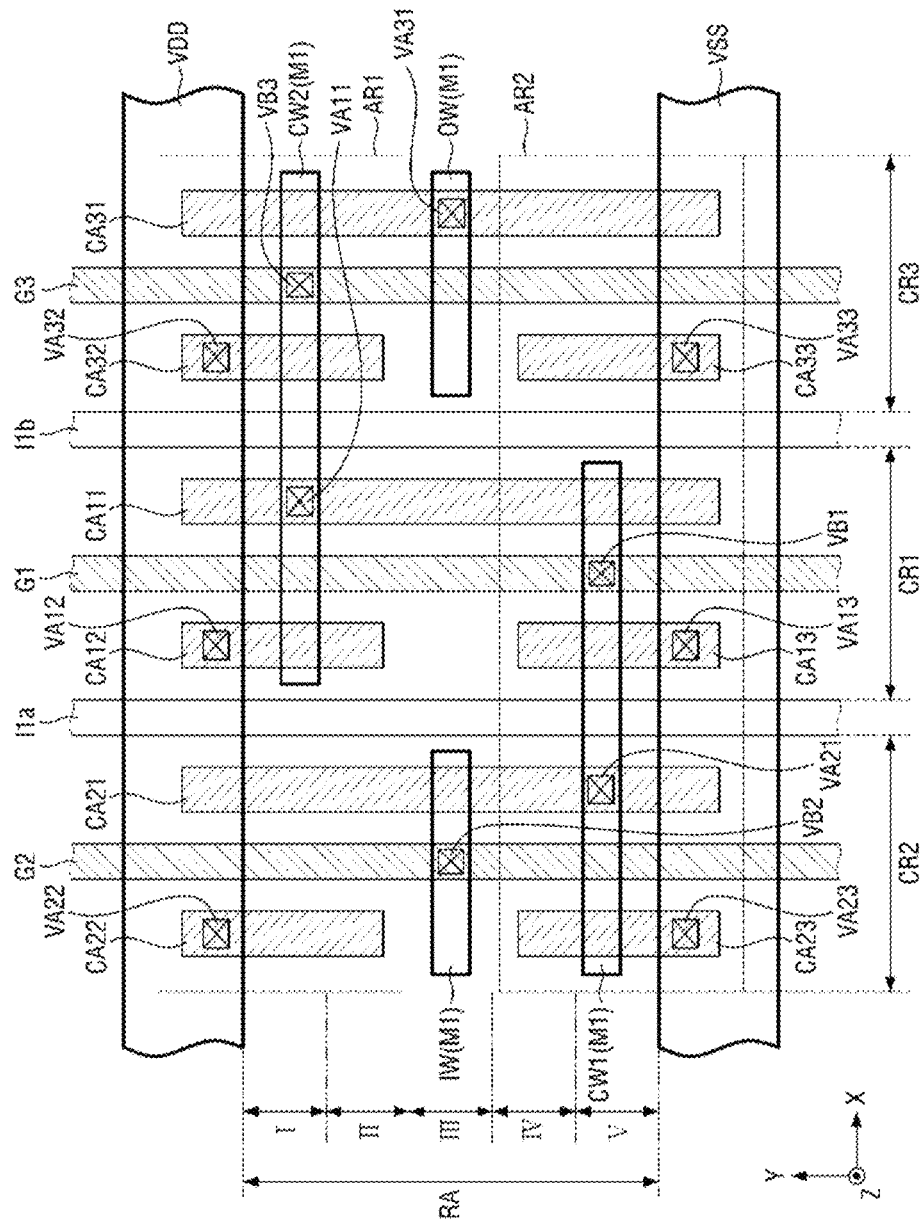

Referring to FIG. 13, compared with FIG. 11, the first connection wiring CW1 is placed in the fifth routing region V.

For example, the fourth source/drain via VA21 and the first gate via VB1 may all be placed in the fifth routing regions V. In some embodiments, the first connection wiring CW1 extends in the first direction X within the fifth routing region V, and may connect the fourth source/drain via VA21 and the first gate via VB1.

In some embodiments, the first wiring IW may be placed in the third routing region III.

Figure 14:
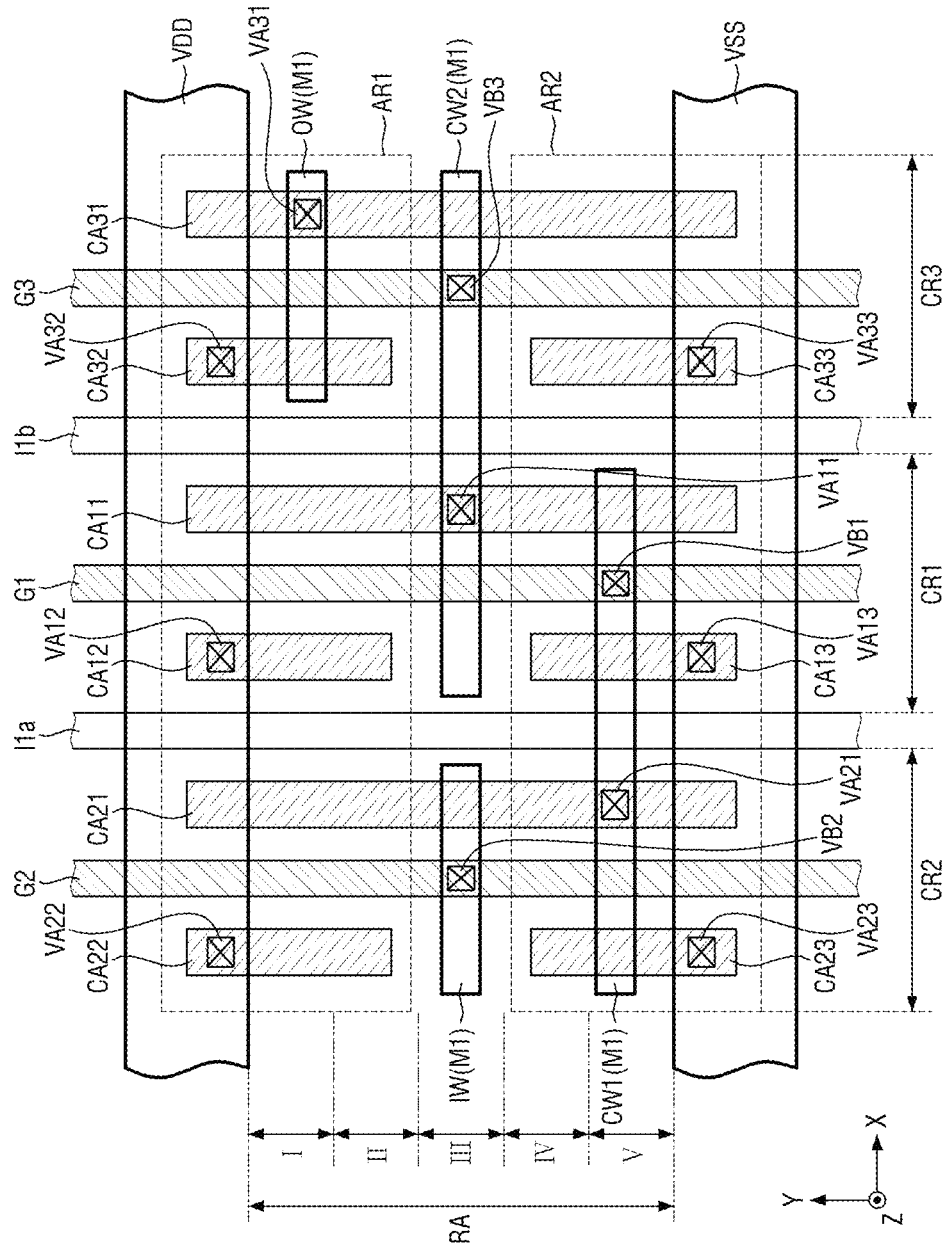

Referring to FIG. 14, compared with FIG. 13, the second connection wiring CW2 is placed in the third routing region III.

For example, the first source/drain via VA11 and the third gate via VB3 may all be placed in the third routing region III. In some embodiments, the second connection wiring CW2 extends in the first direction X within the third routing region III, and may connect the first source/drain via VA11 and the third gate via VB3.

In some embodiments, the second wiring OW may be placed in the first routing region I.

In FIGS. 10 through 14, although the plurality of wiring patterns M1 is shown as being placed only in the first, third and fifth routing regions V, this is only for simplicity of explanation. For example, the plurality of wiring patterns M1 may, of course, be placed in the second and fourth routing regions II and IV.

Figure 15:
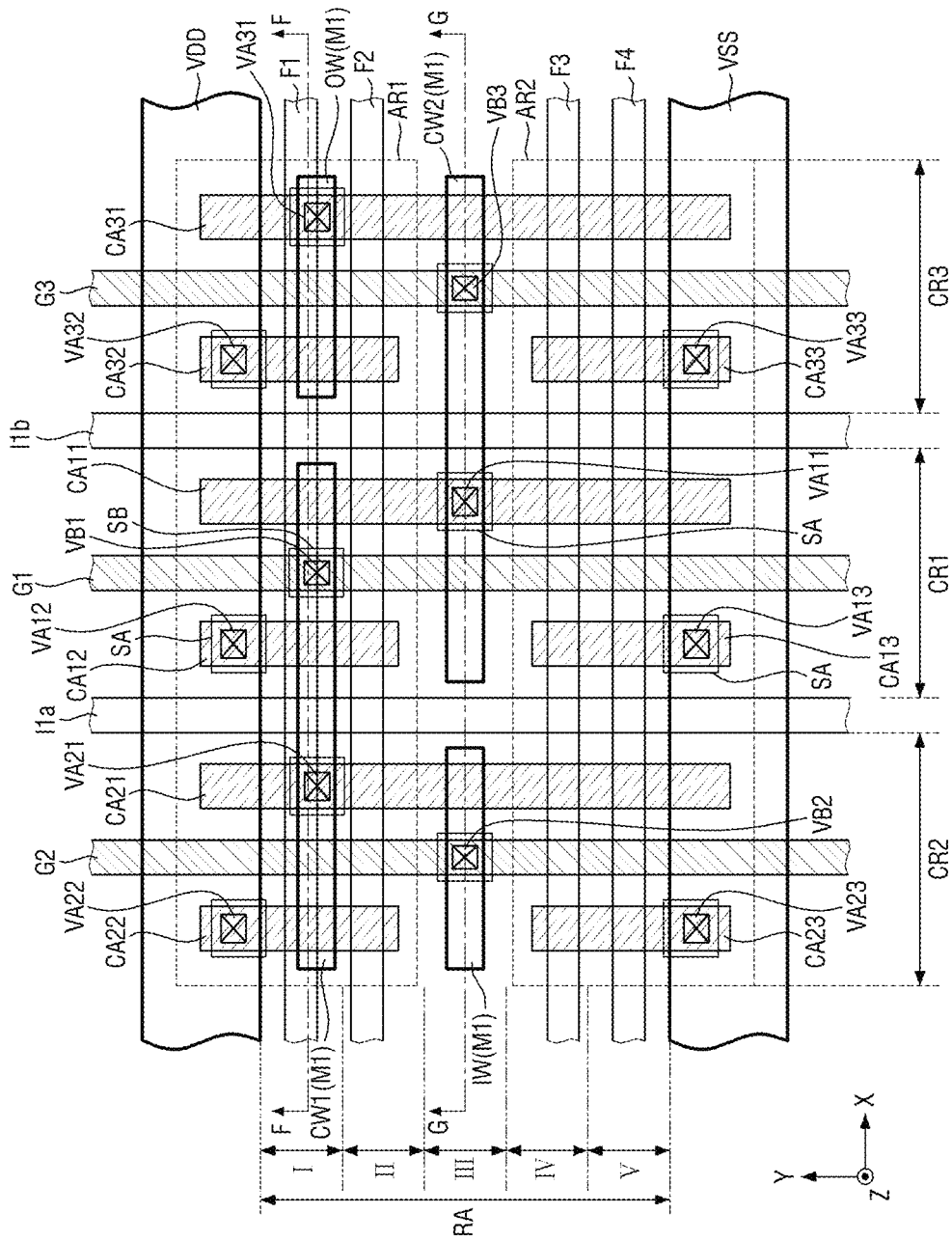
FIG. 15 is a layout diagram for explaining the semiconductor device according to some embodiments.
Figure 16:
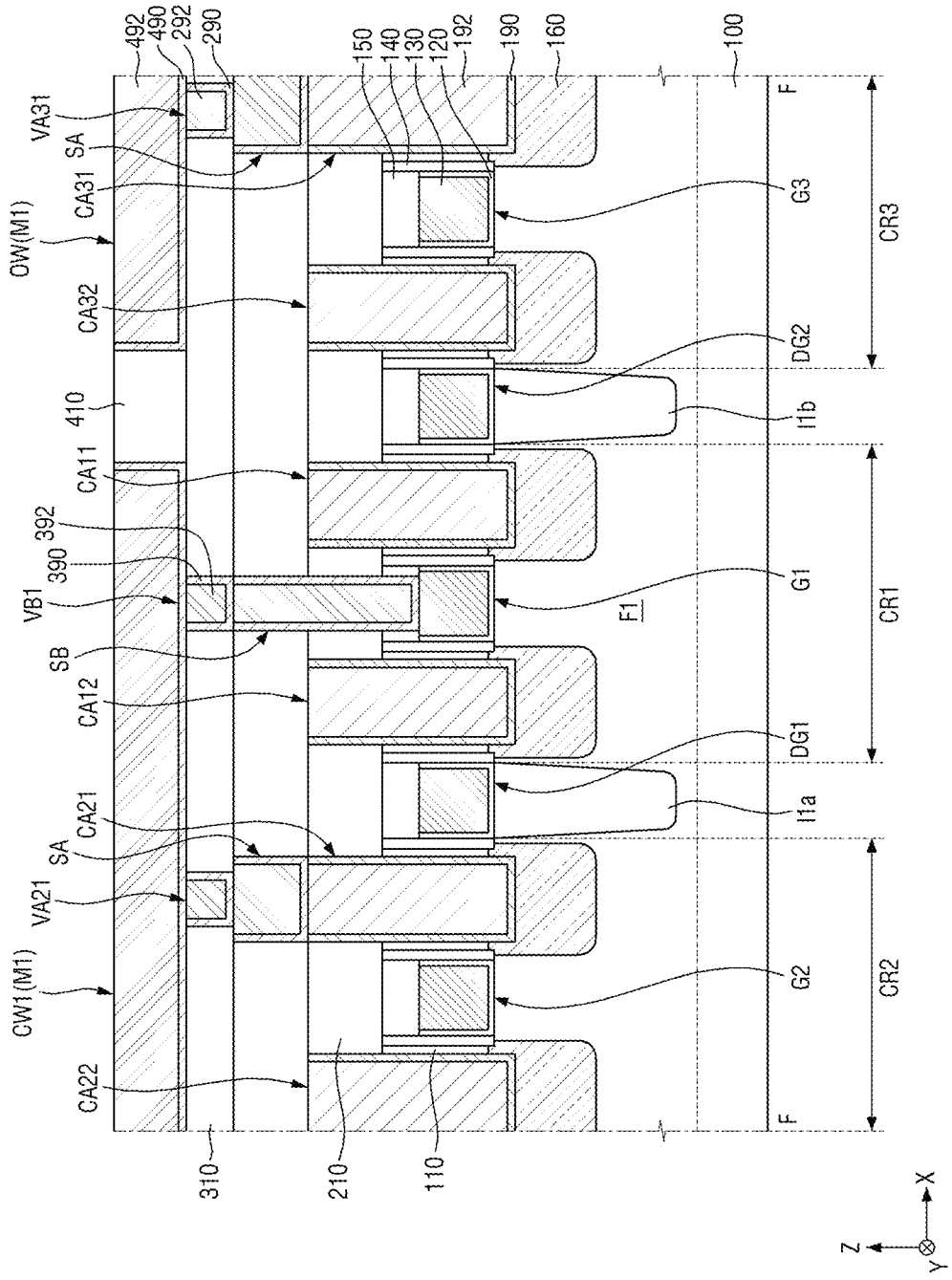
FIG. 16 is a cross-sectional view taken along a line F-F of FIG. 15.
Figure 17:
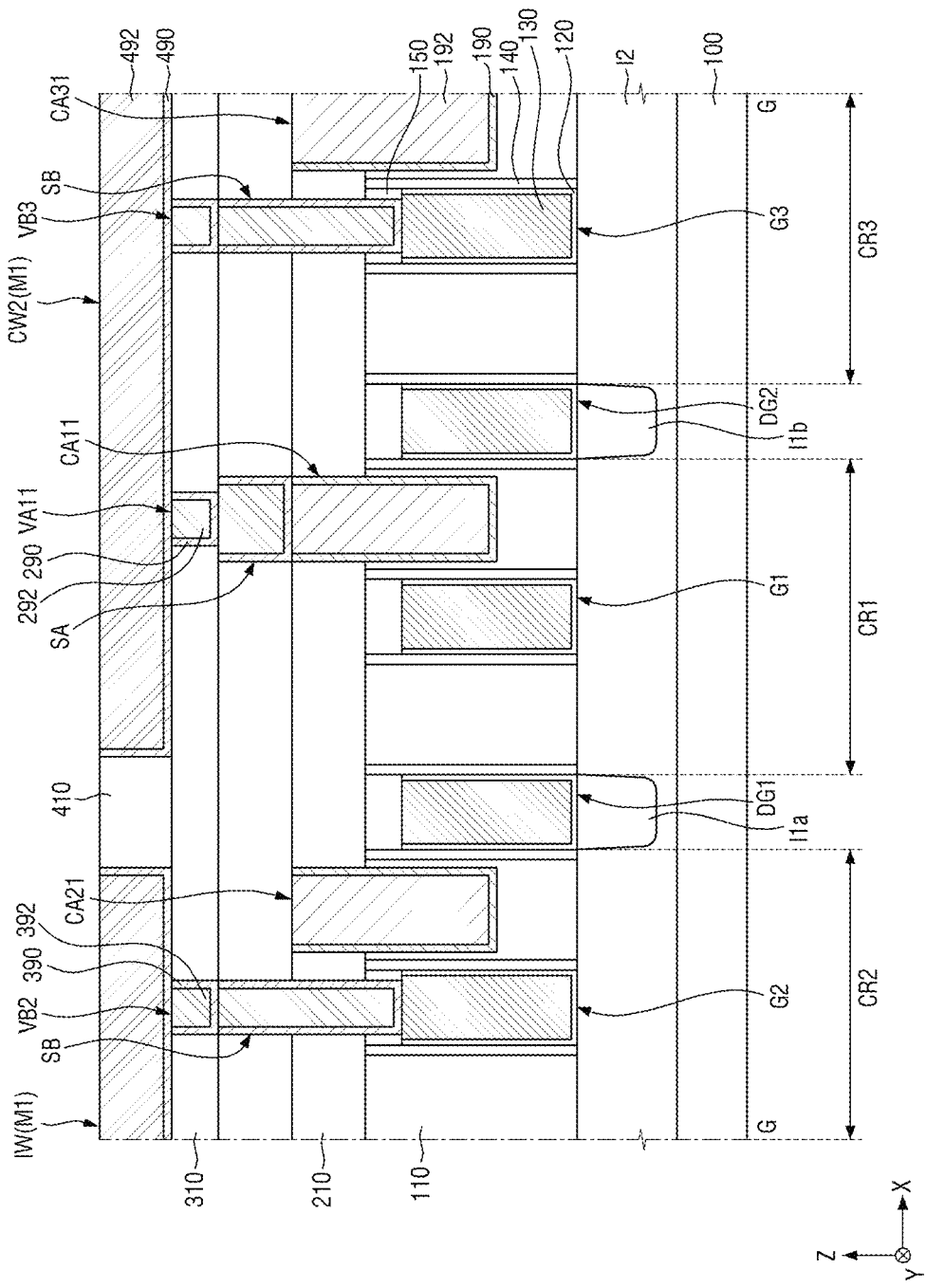
FIG. 17 is a cross-sectional view taken along a line G-G of FIG. 15.

FIG. 15 is a layout diagram for explaining the semiconductor device according to some embodiments. FIG. 16 is a cross-sectional view taken along a line F-F of FIG. 15. FIG. 17 is a cross-sectional view taken along a line G-G of FIG. 15. For convenience of explanation, repeated parts of contents described above using FIGS. 1 to 7 will be briefly described or omitted.

Referring to FIGS. 15 to 17, the semiconductor device according to some embodiments further includes a first connection via SA and a second connection via SB.

The first connection via SA may connect the source/drain contacts CA11 to CA33 and the source/drain vias VA11 to VA33. For example, as shown in FIGS. 16 and 17, the first connection via SA may be interposed between the source/drain contacts CA11 to CA33 and the source/drain vias VA11 to VA33 to connect them.

The second connection via SB may connect the gate electrodes G1 to G3 and the gate vias VB1 to VB3. For example, as shown in FIGS. 16 and 17, the second connection via SB is interposed between the gate electrodes G1 to G3 and the gate vias VB1 to VB3 to connect them.

Figure 18:
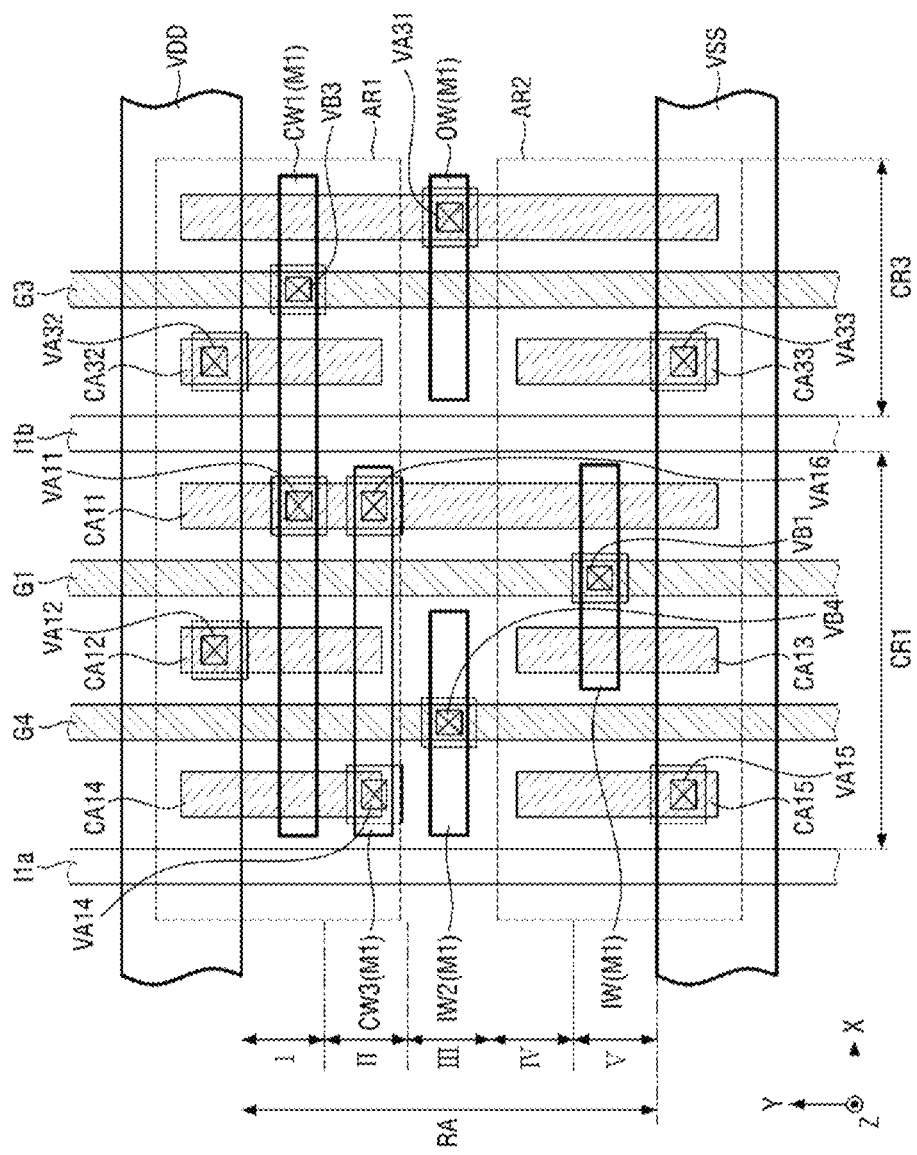
FIG. 18 is a layout diagram for explaining the semiconductor device according to some embodiments.

FIG. 18 is a layout diagram for explaining the semiconductor device according to some embodiments. For convenience of explanation, repeated parts of contents described above using FIG. 1 will be briefly described or omitted.

Referring to FIG. 18, the semiconductor device according to some embodiments further includes a fourth gate electrode G4, tenth and eleventh source/drain contacts CA14 and CA15, tenth to twelfth source/drain vias VA14 to VA16, a fourth gate via VB4, a third wiring IW2, and a third connection wiring CW3.

The fourth gate electrode G4 may extend in the second direction Y within the first cell region CR1. For example, the second source/drain contact CA12 and the third source/drain contact CA13 may be placed on one side of the fourth gate electrode G4. In some embodiments, the second source/drain contact CA12 and the third source/drain contact CA13 may be interposed between the first gate electrode G1 and the fourth gate electrode G4.

A tenth source/drain contact CA14 and an eleventh source/drain contact CA15 may be placed on the other side of the fourth gate electrode G4 in the first cell region CR1. In some embodiments, the tenth source/drain contact CA14 and the eleventh source/drain contact CA15 may be spaced apart from each other. For example, the tenth source/drain contact CA14 may be formed in the first active region AR1, and the eleventh source/drain contact CA15 may be formed in the second active region AR2.

A tenth source/drain via VA14 is placed to overlap the tenth source/drain contact CA14 in the third direction Z, and may be connected to the tenth source/drain contact CA14. An eleventh source/drain via VA15 is placed to overlap the eleventh source/drain contact CA15 in the third direction Z, and may be connected to the eleventh source/drain contact CA15.

A twelfth source/drain via VA16 is placed to overlap the first source/drain contact CA11 in the third direction Z, and may be connected to the first source/drain contact CA11. In some embodiments, the twelfth source/drain via VA16 may be spaced apart from the first source/drain via VA11 in the second direction Y.

The fourth gate via VB4 is placed to overlap the fourth gate electrode G4 in the third direction Z, and may be connected to the fourth gate electrode G4.

The third wiring IW2 may be connected to the fourth gate electrode G4. For example, the third wiring IW2 may be placed to overlap the fourth gate via VB4 in the third direction Z. The third wiring IW2 may be connected to the fourth gate electrode G4 by the fourth gate via VB4.

In some embodiments, the first wiring IW may function as the first input wiring that provides the first input signal to the first cell region CR1, and the third wiring IW2 may function as a second input wiring that provides a second input signal different from the first input signal to the first cell region CR1.

The third connection wiring CW3 may connect the tenth source/drain contact CA14 and the first source/drain contact CA11. For example, the third connection wiring CW3 may be placed to overlap the tenth source/drain via VA14 and the twelfth source/drain via VA16 in the third direction Z. The third connection wiring CW3 may be connected to the tenth source/drain contact CA14 and the twelfth source/drain contact VA16 by the tenth source/drain via VA14 and the first source/drain contact CA11.

In some embodiments, the first connection wiring CW1 may be placed in one of a plurality of routing regions RA, the first wiring IW may be placed in the other one of the plurality of routing regions RA, the second wiring OW may be placed in the other one of the plurality of routing regions RA, and the third connection wiring CW3 may be placed in the other one of the plurality of routing regions RA.

For example, as shown, the first connection wiring CW1 may be placed in the first routing region I, the first wiring IW may be placed in the fifth routing region V, the second wiring OW may be placed in the third routing region III, and the third connection wiring CW3 may be placed in the second routing region II.

As a result, even when there is a plurality of input wirings, a semiconductor device in which the use of additional top wirings is reduced and power loss and PnR resource loss are reduced may be provided.

Hereinafter, a layout design method for the semiconductor device and a method for fabricating the same according to some embodiments will be described with reference to FIGS. 1 to 23.

Figure 19:
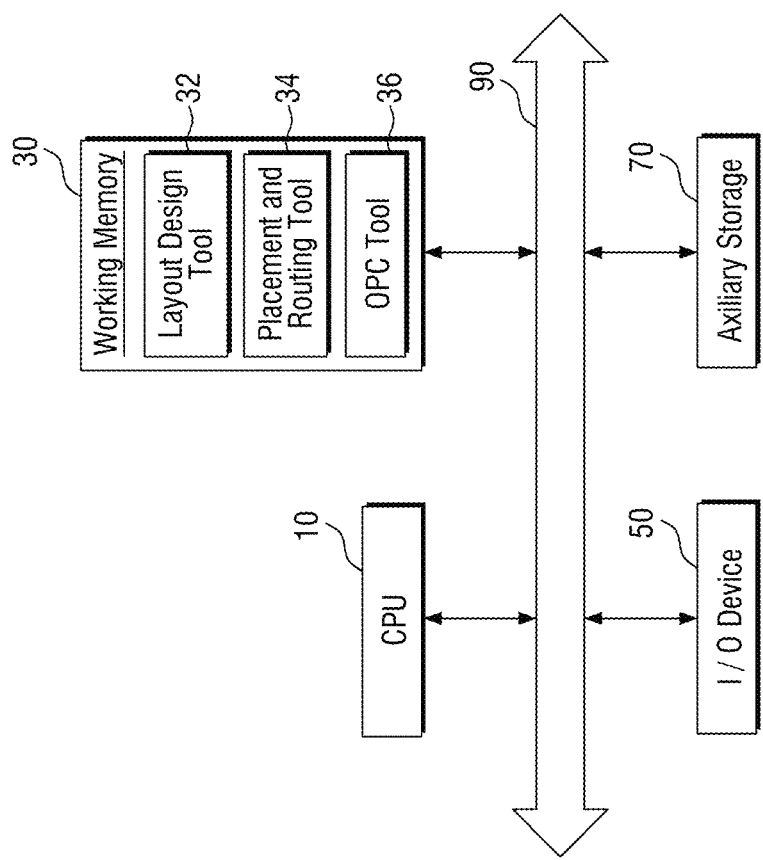
FIG. 19 is a block diagram of a computer system for executing the layout design of the semiconductor device according to some embodiments.

FIG. 19 is a block diagram of a computer system for executing the layout design of the semiconductor device according to some embodiments. For convenience of explanation, repeated parts of contents described above using FIGS. 1 to 18 will be briefly described or omitted.

Referring to FIG. 19, the computer system may include a CPU 10, a working memory 30, an input/output device 50, and an auxiliary storage 70. Here, the computer system may be provided as a dedicated device for layout design of the semiconductor device according to some embodiments. In some embodiments, the computer system may also include various design and verification simulation programs.

The CPU 10 may execute software (an application program, an operating system, a device driver or the like) to be executed on the computer system. The CPU 10 may execute the operating system to be loaded into the working memory 30. The CPU 10 may execute various application programs to be driven on the basis of the operating system. For example, the CPU 10 may execute a layout design tool 32, a placement and routing tool 34 and/or an OPC tool 36 loaded into the working memory 30.

The operating system or the application program may be loaded into the working memory 30. When the computer system is booted, the operating system image (not shown) stored in the auxiliary storage 70 may be loaded into the working memory 30 in accordance with a booting sequence. The operating system may support various input/output operations of the computer system.

The layout design tool 32 for the layout design of the semiconductor device according to some embodiments may be loaded from the auxiliary storage 70 into the working memory 30. Subsequently, the placement and routing tool 34 which places the designed standard cells, rearranges the internal wiring pattern in the placed standard cells, and routes the placed standard cell may be loaded from the auxiliary storage 70 into the working memory 30. Subsequently, an OPC tool 36 for performing optical proximity correction (OPC) on the designed layout data may be loaded from the auxiliary storage 70 into the working memory 30.

The input/output device 50 may control user's input and output from a user interface device. For example, the input/output device 50 may be equipped with a keyboard or a monitor to receive input of information from the user. The user may receive the input of information about semiconductor regions or data paths that require adjusted operating characteristics, using the input/output device 50. Further, the processing course, the processing result and the like of the OPC tool 36 may be displayed through the input/output device 50.

The auxiliary storage 70 may be provided as a storage medium of the computer system. The auxiliary storage 70 may store an application program, an operating system image, and various data.

A system interconnector 90 may be a system bus for providing a network inside the computer system. The CPU, 10, the working memory 30, the input/output device 50, and the auxiliary storage 70 may be electrically connected to exchange data with each other through the system interconnector 90.

Figure 20:
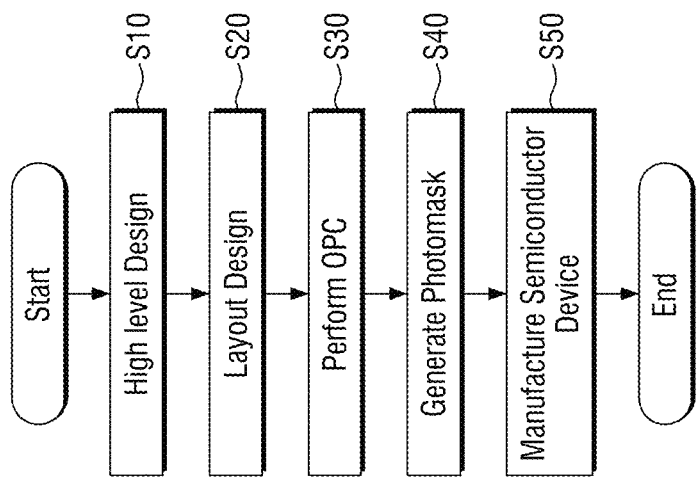
FIG. 20 is a flowchart for explaining a layout design method for the semiconductor device according to some embodiments and a method for fabricating the same.

FIG. 20 is a flowchart for explaining a layout design method for the semiconductor device according to some embodiments and a method for fabricating the same.

Referring to FIG. 20, a high level design of a semiconductor integrated circuit may be executed using the computer system described above with reference to FIG. 19 (S10). The high level design may mean describing an integrated circuit to be designed in a parent language of a host language. For example, a host language such as C language may be used for the high level design. Circuits designed by the high level design may be expressed more specifically by coding or simulation of a register transfer level (RTL). Subsequently, codes generated by the register transfer level coding are converted into a netlist and may be synthesized as an entire semiconductor element. A synthesized schematic circuit is verified by a simulation tool, and an adjustment process may be accompanied depending on the verification result.

Subsequently, a layout design for implementing the logically completed semiconductor integrated circuit on a silicon substrate may be executed (S20). For example, a layout design may be performed with reference to the schematic circuit synthesized in a high level design or a netlist corresponding thereto. The layout design may include routing procedure for placing and connecting various standard cells to be provided in the cell library according to the defined design rule.

The layout may be a procedure for defining a form or size of a pattern for constituting the transistor and metal wirings to be actually formed on the silicon substrate. For example, in order to actually form an inverter circuit on the silicon substrate, a PFET, a NFET, a P-WELL, a N-WELL, a gate electrode, and layout patterns such as wiring patterns to be placed thereon may be appropriately placed.

Subsequently, routing on the selected and placed standard cells may be performed. Specifically, the top wirings (routing patterns) may be placed on the placed standard cell. By executing the routing, the placed standard cells may be connected to each other according to the design.

After routing, the layout may be verified as to whether there is a part that is against the design rule. Items to be verified may include a DRC (Design Rule Check), an ERC (Electronic Rule Check), a LVS (Layout vs Schematic), and the like.

Subsequently, an optical proximity correction (OPC) procedure may be performed (S30). The layout patterns provided through the layout design may be implemented on the silicon substrate, using a photolithography process. At this time, the optical proximity correction may be a technique for correcting distortion that may occur in the photolithography process.

Subsequently, a photomask may be fabricated on the basis of the layout changed by the optical proximity correction (S40). The photomask may be fabricated, for example, in a manner of drawing the layout patterns using a chromium film coated on a glass substrate.

Subsequently, a semiconductor element may be fabricated, using the generated photomask (S50). In the fabricating process of the semiconductor element using a photomask, various types of exposure and etching processes may be repeated. The form of the patterns formed on the silicon substrate at the time of the layout design may be sequentially formed through such processes.

Figure 21:
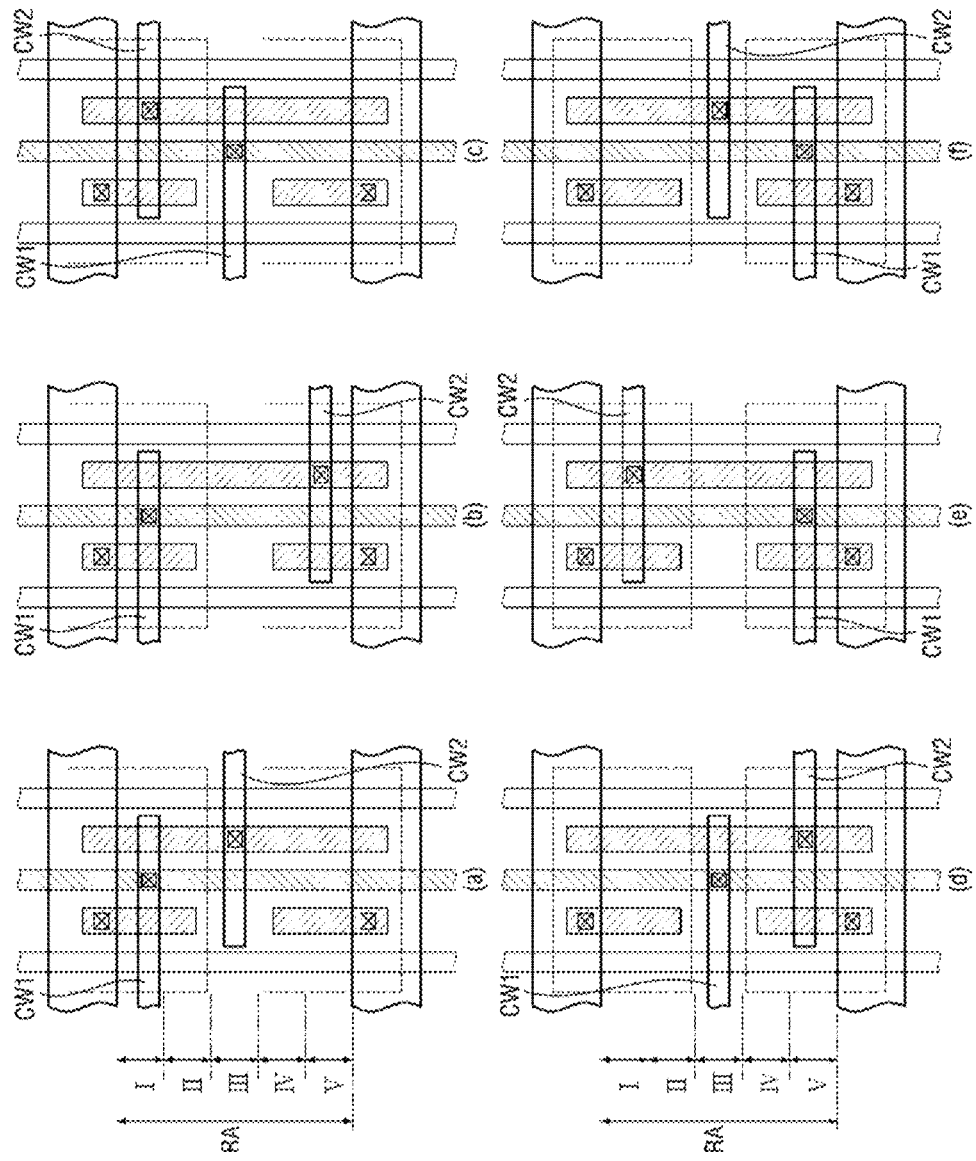
FIGS. 21 to 23 are layout diagrams for explaining a layout design method for the semiconductor devices according to some embodiments.
Figure 22:
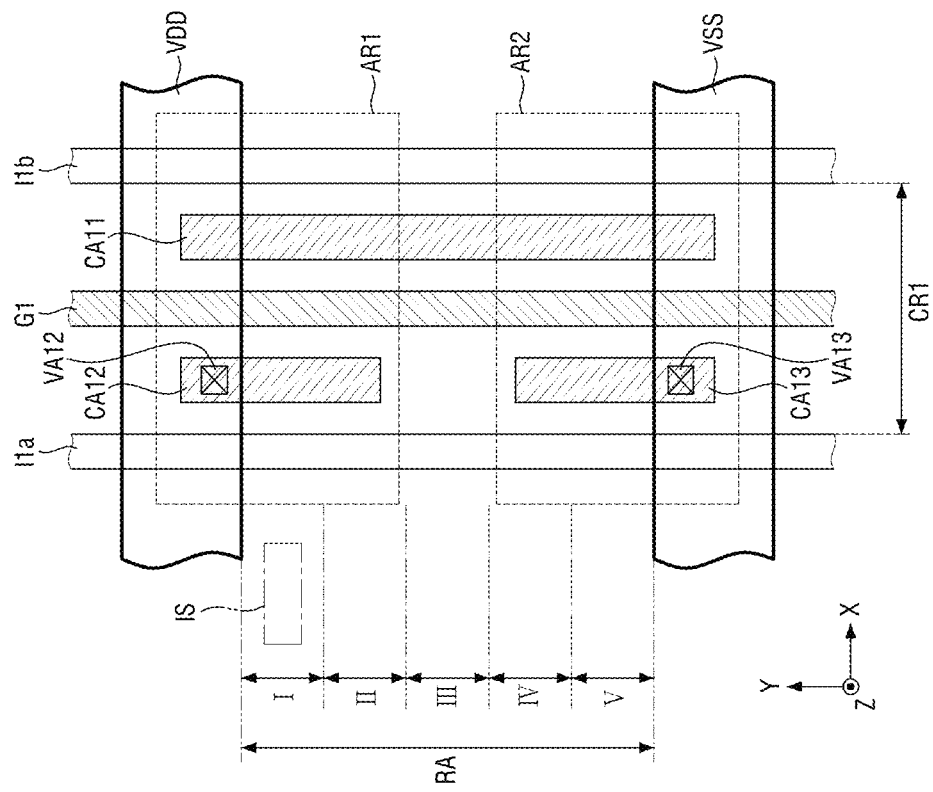
Figure 23:
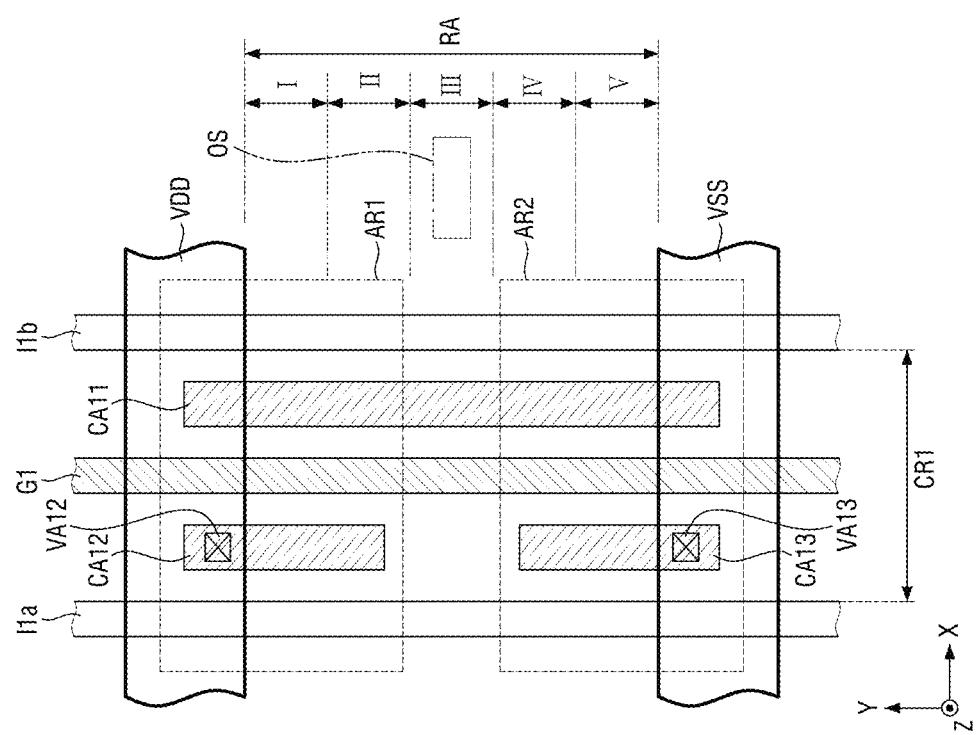

FIGS. 21 to 23 are layout diagrams for explaining a layout design method for the semiconductor devices according to some embodiments. For convenience of explanation, repeated parts of contents described above using FIGS. 1 to 20 will be briefly described or omitted.

Referring to FIG. 21, in the layout design method for the semiconductor device according to some embodiments, various cell layouts may be provided depending on the placement of the first connection wiring CW1 and the second connection wiring CW2.

For example, cell layouts according to (a) to (f) of FIG. 21 may be provided depending on the placement of the first connection wiring CW1 and the second connection wiring CW2. Although the first connection wiring CW1 and the second connection wiring CW2 are shown as being only placed in the first, third and fifth routing regions I, III and V in FIG. 21, this is merely for simplicity of explanation. For example, the first connection wiring CW1 or the second connection wiring CW2 may, of course, be placed in the second and fourth routing regions II and IV.

Referring to FIG. 22, in the layout design method for the semiconductor device according to some embodiments, an input wiring IS for the first cell region CR1 may be provided.

In some embodiments, the input wiring IS may be placed in one of a plurality of routing regions RA. For example, as shown, the input wiring IS may be placed in the first routing region I.

In such a case, among the various cell layouts, a cell layout in which the first connection wiring CW1 is placed within the first routing region I may be provided in the first cell region CR1. For example, a cell layout according to (a) or (b) of FIG. 21 may be provided in the first cell region CR1. Therefore, an input signal may be provided in the first cell region CR1 without using an additional top wiring.

Referring to FIG. 23, in the layout design method for the semiconductor device according to some embodiments, the output wiring OS for the first cell region CR1 may be provided.

In some embodiments, the output wiring OS may be placed in one of a plurality of routing regions RA. For example, as shown, the output wiring OS may be placed in the third routing region III.

In such a case, among the various cell layouts, a cell layout in which the second connection wiring CW2 is placed in the third routing region III may be provided in the first cell region CR1. For example, a cell layout according to (a) or (f) of FIG. 21 may be provided in the first cell region CR1. Accordingly, an output signal may be provided from the first cell region CR1 without using an additional top wiring.

In concluding the detailed description, those skilled in the art will appreciate that many variations and modifications may be made to the presented embodiments without substantially departing from the principles of inventive concepts. Therefore, the presented embodiments are described in a generic and descriptive sense only and not for purposes of limitation.

What is claimed is:

1. A semiconductor device comprising:
   a substrate;
   a first active pattern extending in a first direction on the substrate;
   a second active pattern extending in the first direction on the substrate;
   a first gate electrode extending in a second direction, the second direction intersecting the first direction, the first gate electrode intersecting the first active pattern and the second active pattern;
   a first source/drain contact extending in the second direction on one side of the first gate electrode, the first source/drain contact connecting to a first source/drain region of the first active pattern and a second source/drain region of the second active pattern;
   a first source/drain via connected to the first source/drain contact;
   a second gate electrode extending in the second direction, the second gate electrode intersecting the first active pattern and the second active pattern;
   a first cell separation film extending in the second direction between the first source/drain contact and the second gate electrode, the first cell separation film crossing the first active pattern and the second active pattern;
   a first gate via connected to the second gate electrode and arranged together with the first source/drain via along the first direction; and
   a first connection wiring extending in the first direction and connecting the first source/drain via and the first gate via.

2. The semiconductor device of claim 1, wherein the first connection wiring extends in a straight line in the first direction.

3. The semiconductor device of claim 1, further comprising:
   a second source/drain contact connected to the first source/drain region, on the other side of the first gate electrode;
   a third source/drain contact spaced apart from the second source/drain contact and connected to the second source/drain region, on the other side of the first gate electrode;
   a first power supply wiring extending in the first direction and connected to the second source/drain contact; and
   a second power supply wiring extending in the first direction and connected to the third source/drain contact.

4. The semiconductor device of claim 3, wherein the first connection wiring is placed at a same level as the first power supply wiring and the second power supply wiring.

5. The semiconductor device of claim 3, wherein
   the first power supply wiring is configured to have a drain voltage applied thereto, and
   the second power supply wiring is configured to have a source voltage applied thereto.

6. The semiconductor device of claim 1, further comprising:
   a second source/drain contact spaced apart from the first source/drain contact by the first cell separation film and connected to the first source/drain region, on one side of the second gate electrode;
   a second source/drain via connected to the second source/drain contact; and
   an output wiring extending in the first direction and connected to the second source/drain via.

7. The semiconductor device of claim 6, wherein the first connection wiring is at a same level as the output wiring.

8. The semiconductor device of claim 1, further comprising:
   a second source/drain contact connected to the first source/drain region;
   a second source/drain via connected to the second source/drain contact;
   a second cell separation film extending in the second direction between the second source/drain contact and the first gate electrode, the second cell separation film crossing the first active pattern and the second active pattern;

a second gate via connected to the first gate electrode and arranged together with the second source/drain via along the first direction; and a second connection wiring extending in the first direction and connecting the second source/drain via and the second gate via.

9. The semiconductor device of claim 8, wherein the first connection wiring and the second connection wiring are placed at a same level.

10. The semiconductor device of claim 8, wherein the second connection wiring is spaced apart from the first connection wiring in the second direction.

11. The semiconductor device of claim 8, further comprising:

a third gate electrode extending in the second direction and intersecting the first active pattern and the second active pattern, on one side of the second source/drain contact;

a third gate via connected to the third gate electrode; and an input wiring extending in the first direction and connected to the third gate via.

12. A semiconductor device, which includes a first cell region, and a second cell region and a third cell region each placed on both sides of the first cell region in a first direction, the semiconductor device comprising:

a first active region and a second active region extending in the first direction on the first cell region, the second cell region, and the third cell region, the second active region spaced apart from the first active region in a second direction intersecting the first direction;

a first gate electrode extending in the second direction in the first cell region;

a first source/drain contact extending in the second direction in the first cell region on one side of the first gate electrode, the first source/drain contact connected to the first active region and the second active region, a second gate electrode extending in the second direction in the second cell region;

a second source/drain contact in the second cell region on one side of the second gate electrode;

a first connection wiring extending in the first direction and connected to the second source/drain contact and the first gate electrode;

a third gate electrode extending in the second direction in the third cell region; and a second connection wiring extending in the first direction and connected to the first source/drain contact and the third gate electrode, the second connection wiring and the first connection wiring being spaced apart from each other in the second direction in the first cell region.

13. The semiconductor device of claim 12, wherein the first connection wiring and the second connection wiring are placed at a same level.

14. The semiconductor device of claim 13, wherein the second source/drain contact connects the first active region in the second cell region and the second active region in the second cell region.

15. The semiconductor device of claim 13, further comprising:

an input wiring connected to the second gate electrode and extending in the first direction, in the second cell region, wherein the first connection wiring and the input wiring are spaced apart from each other in the second direction, in the second cell region.

16. The semiconductor device of claim 15, wherein the input wiring is at a same level as the first connection wiring and the second connection wiring.

17. The semiconductor device of claim 15, wherein the input wiring overlaps the second connection wiring in the first direction.

18. The semiconductor device of claim 12, further comprising:

a third source/drain contact in the third cell region on one side of the third gate electrode; and an output wiring connected to the third source/drain contact and extending in the first direction in the third cell region, wherein the second connection wiring and the output wiring are spaced apart from each other in the second direction in the third cell region.

19. The semiconductor device of claim 18, wherein the output wiring is at a same level as the first connection wiring and the second connection wiring.

20. The semiconductor device of claim 18, wherein the output wiring overlaps the first connection wiring in the first direction.

* * * * *